United States Patent
Kawaguchi et al.

(10) Patent No.: US 10,921,489 B2
(45) Date of Patent: Feb. 16, 2021

(54) POLYMERIZABLE COMPOSITION FOR OPTICAL MATERIAL, OPTICAL MATERIAL OBTAINED FROM THE COMPOSITION, AND PLASTIC LENS

(71) Applicant: MITSUI CHEMICALS, INC., Tokyo (JP)

(72) Inventors: Masaru Kawaguchi, Omuta (JP); Nobuo Kawato, Kurume (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/757,897

(22) PCT Filed: Sep. 16, 2016

(86) PCT No.: PCT/JP2016/077418
§ 371 (c)(1),
(2) Date: Mar. 6, 2018

(87) PCT Pub. No.: WO2017/047742
PCT Pub. Date: Mar. 23, 2017

(65) Prior Publication Data
US 2018/0341043 A1 Nov. 29, 2018

(30) Foreign Application Priority Data

Sep. 16, 2015 (JP) .................. 2015-183492
Dec. 9, 2015 (JP) .................. 2015-240354

(51) Int. Cl.
*G02B 1/04* (2006.01)
*G02C 7/10* (2006.01)
*C08F 2/44* (2006.01)
*C08F 222/10* (2006.01)

(52) U.S. Cl.
CPC ............ *G02B 1/041* (2013.01); *C08F 2/44* (2013.01); *C08F 222/1006* (2013.01); *G02B 1/04* (2013.01); *G02C 7/10* (2013.01); *G02C 7/102* (2013.01); *C08F 222/1063* (2020.02)

(58) Field of Classification Search
CPC .................................................. G02B 1/041
See application file for complete search history.

(56) References Cited

U.S. PATENT DOCUMENTS

| | | |
|---|---|---|
| 5,683,628 A | 11/1997 | Mizuno et al. |
| 5,770,115 A | 6/1998 | Misura |
| 5,914,174 A | 6/1999 | Gupta et al. |
| 6,141,135 A | 10/2000 | Nagoh et al. |
| 6,506,538 B1 | 1/2003 | Breyne et al. |
| 7,332,260 B2 | 2/2008 | Breyne et al. |
| 7,999,989 B2 | 8/2011 | Asai et al. |
| 8,705,160 B2 | 4/2014 | He et al. |
| 8,865,029 B2 | 10/2014 | Evans et al. |
| 9,217,812 B2 | 12/2015 | Evans et al. |
| 9,250,356 B2 | 2/2016 | Evans et al. |
| 9,335,566 B2 | 5/2016 | Kadowaki |
| 9,605,103 B2 | 3/2017 | Ryu |
| RE46,357 E | 4/2017 | Asai et al. |
| 2002/0197562 A1 | 12/2002 | Breyne et al. |
| 2006/0052547 A1 | 3/2006 | Jethmalani et al. |
| 2009/0316246 A1 | 12/2009 | Asai et al. |

(Continued)

FOREIGN PATENT DOCUMENTS

| | | | |
|---|---|---|---|
| AU | 7516091 | * 10/1991 | ............ C08F 265/06 |
| CA | 1028088 A | * 3/1978 | ............... G02B 1/04 |

(Continued)

OTHER PUBLICATIONS

International Search Report (PCT/ISA/210) dated Dec. 6, 2016, by the Japan Patent Office as the International Searching Authority for International Application No. PCT/JP2016/077418.

(Continued)

*Primary Examiner* — Liam J Heincer
(74) *Attorney, Agent, or Firm* — Buchanan, Ingersoll & Rooney PC

(57) ABSTRACT

A polymerizable composition for an optical material according to the present invention, including: a monomer mixture (A) including a polymerizable monomer having a (meth)acrylic group, a photochromic compound (B) which is at least one selected from compounds represented by Formulae (1) and (2); and an ultraviolet absorbing agent (C) which is at least one selected from compounds represented by Formulae (a) to (c).

PC—L-Chain (1)

PC—L-chain-L'—PC' (2)

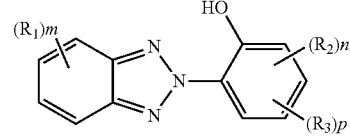

(a)

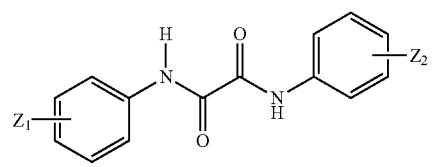

(b)

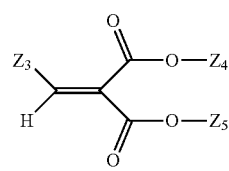

(c)

8 Claims, No Drawings

(56) References Cited

U.S. PATENT DOCUMENTS

| | | |
|---|---|---|
| 2011/0147681 A1 | 6/2011 | Evans et al. |
| 2011/0190455 A1 | 8/2011 | Partington |
| 2012/0154910 A1* | 6/2012 | Yajima ............ B29D 11/00644 |
| | | 359/487.02 |
| 2014/0027684 A1 | 1/2014 | Evans et al. |
| 2014/0042377 A1* | 2/2014 | Evans ................ C07D 311/92 |
| | | 252/586 |
| 2014/0198296 A1 | 7/2014 | Kadowaki |
| 2016/0170107 A1 | 6/2016 | Ryu |
| 2016/0194429 A1 | 7/2016 | Ryu |

FOREIGN PATENT DOCUMENTS

| | | |
|---|---|---|
| CN | 102378926 A | 3/2012 |
| EP | 2733155 A1 | 5/2014 |
| JP | H08-272036 A | 10/1996 |
| JP | H10-101802 A | 4/1998 |
| JP | H10-186291 A | 7/1998 |
| JP | H10-231331 A | 9/1998 |
| JP | 2000-008031 A | 1/2000 |
| JP | 2004-078052 A | 3/2004 |
| JP | 2005-023238 A | 1/2005 |
| JP | 2008-030439 A | 2/2008 |
| JP | 2010-235934 A | 10/2010 |
| JP | 2011-144181 A | 7/2011 |
| JP | 2015-025063 A | 2/2015 |
| WO | 96/37576 A1 | 11/1996 |
| WO | WO 2009/146509 A1 | 12/2009 |
| WO | WO 2010/020770 A1 | 2/2010 |
| WO | WO 2012/141306 A1 | 10/2012 |
| WO | WO 2012/149599 A1 | 11/2012 |
| WO | WO 2012/162725 A1 | 12/2012 |
| WO | WO 2014/208994 A1 | 12/2014 |
| WO | WO 2015/016363 A1 | 2/2015 |

OTHER PUBLICATIONS

Written Opinion (PCT/ISA/237) dated Dec. 6, 2016, by the Japan Patent Office as the International Searching Authority for International Application No. PCT/JP2016/077418.

Knels et al., Blue light stress in retinal neuronal (R28) cells is dependent on wavelength range and irradiance, *European Journal of Neuroscience*, vol. 34, 2011, pp. 548-558, Federation of European Neuroscience Societies and Blackwell Publishing Ltd. DOI: 10.1111/j.1460-9568.2011.07790.x.

Extended Search Report issued by the European Patent Office in corresponding European Patent Application No. 16846613.4-1102 dated Mar. 25, 2019 (6 pages).

Office Action issued by the Chinese Patent Office in corresponding Chinese Patent Application No. 201680051599.9 dated Aug. 13, 2019 (18 pages).

Office Action issued by the Indian Patent Office in corresponding Indian Patent Application No. 201817007750 dated Nov. 29, 2019 (6 pages including partial English translation).

* cited by examiner

POLYMERIZABLE COMPOSITION FOR OPTICAL MATERIAL, OPTICAL MATERIAL OBTAINED FROM THE COMPOSITION, AND PLASTIC LENS

TECHNICAL FIELD

The present invention relates to a polymerizable composition for an optical material including a photochromic compound and an ultraviolet absorbing agent, an optical material and a plastic lens obtained from the composition.

BACKGROUND ART

A plastic lens has a high refractive index, has a high Abbe number, is lightweight, is hard to break, and is capable of being dyed, compared with inorganic lenses and thus has been rapidly spread as an optical material for a spectacle lens, a camera lens, and the like. Various molded products for a lens have been developed and used so far.

Among the materials, representative examples thereof include an allyl resin obtained from diethylene glycol bisallyl carbonate or diallyl isophthalate, a (meth)acrylic resin obtained from (meth) acrylate, and a polythiourethane resin obtained from isocyanate and thiol.

Recently, a plastic lens with various functions has been developed.

For example, a plastic lens having a photochromic performance has been developed. Spectacles with photochromic performance exhibit a function to protect eyes from glare by functioning as ordinary transparent color glasses indoors and causing lenses to be colored in gray, brown, and the like in response to sunlight (ultraviolet rays) outdoors. The spectacles are highly functional glasses that can be used indoors and outdoors, and demands thereof have been expanded in recent years.

Examples of the photochromic lens material include descriptions in Patent Documents 1 to 6.

Patent Document 1 discloses that radical polymerization is performed on a polymerizable composition including a photochromic compound and (meth)acrylate and divinylbenzene having a specific structure by a cast polymerization method, so as to provide a photochromic lens for spectacles having high refractive index and excellent photochromic characteristics.

Patent Document 2 discloses that radical polymerization is performed on a composition containing a photochromic compound and a polymerizable monomer having a di(meth) acrylic group by a cast polymerization method to provide a photochromic optical material having various physical properties such as low specific gravity, low impact resistance together with photochromic properties with high photoresponsivity. Patent Document 2 discloses that a composition including a photochromic compound and a polymerizable monomer having polyol or polythiol, polyisocyanate, and a di(meth)acryl group is cured so as to provide a photochromic optical material having a high refractive index.

Patent Document 3 discloses that radical polymerization is performed on a polymerizable composition for an optical material containing a photochromic compound and a fluorene acrylate compound by a cast polymerization method, so as to provide a fluorene acrylic photochromic optical material having high refraction together with excellent photo discoloration performances and excellent optical characteristics.

Patent Document 4 discloses a lens formed of a composition including a predetermined photochromic compound and a di(meth) acrylate compound.

Patent Document 5 discloses a lens having a coating layer formed of a composition including a photochromic compound having a chromene skeleton and a phenol compound on the surface of a thiourethane-based plastic lens.

Patent Document 6 discloses a photochromic lens having a lens substrate formed of a thiourethane resin and a photochromic film formed by applying a solution containing a photochromic compound and a radical polymerizable monomer to the substrate.

Patent Document 7 discloses a compound having photochromic characteristics.

Another function provided to the plastic lens is an ultraviolet cutting function. In recent years, a plastic lens having an ultraviolet (UV) cutting function has been developed.

Patent Document 8 discloses a plastic lens including an ultraviolet absorbing agent having an average light transmittance of equal to or less than 0.5% in a wavelength range of 300 nm to 400 nm.

In recent years, improvement of the function of the plastic lens is required, and the plastic lens having both a photochromic performance and an ultraviolet cutting function described above has been developed. Patent Documents 1 to 3 disclose that an ultraviolet absorbing agent may be added to a polymerizable composition including a photochromic compound. However, in examples, a polymerizable composition having all of these compounds is not specifically disclosed.

RELATED DOCUMENT

Patent Document

[Patent Document 1] Pamphlet of International Publication WO2012/141306
[Patent Document 2] Japanese Unexamined Patent Publication No. 2004-78052
[Patent Document 3] Pamphlet of International Publication WO2014/208994
[Patent Document 4] Japanese Unexamined Patent Publication No. H08-272036
[Patent Document 5] Japanese Unexamined Patent Publication No. 2005-23238
[Patent Document 6] Japanese Unexamined Patent Publication No. 2008-30439
[Patent Document 7] Japanese Unexamined Patent Publication No. 2011-144181
[Patent Document 8] Japanese Unexamined Patent Publication No. H10-186291
[Patent Document 9] Pamphlet of International Publication WO2009/146509
[Patent Document 10] Pamphlet of International Publication WO2010/20770
[Patent Document 11] Pamphlet of International Publication WO2012/149599
[Patent Document 12] Pamphlet of International Publication WO2012/162725

Non-Patent Document

[Non-patent Document 1] The European journal of neuroscience, vol. 34, Iss. 4, 548 to 58, (2011)

SUMMARY OF THE INVENTION

Technical Problem

The photochromic compound exhibits an effect due to ultraviolet rays, but an ultraviolet absorbing agent absorbs ultraviolet rays. Therefore, in a case where a photochromic compound and an ultraviolet absorbing agent are mixed in a resin molded product, an ultraviolet absorbing agent absorbs light in the wavelength range necessary for the photochromic compound to develop a color, and thus the photochromic performances may not be sufficiently exhibited in some cases.

Therefore, in a case where it is desired to simultaneously provide a photochromic performance and an ultraviolet cutting function to plastic lens, for example, a method of adding an ultraviolet absorbing agent to the polymerizable composition to prepare a resin lens and applying a coating agent including a photochromic compound to the surface of the lens is generally performed. However, such a manufacturing method requires a step of preparing a coating agent containing a photochromic compound and a step of applying a coating agent on a resin surface, and thus the number of manufacturing steps increases such that a manufacturing cost of the plastic lens has been increased in some cases.

Solution to Problem

In view of these techniques in the related art, the present inventors have diligently conducted research and found that, a combination of a specific photochromic compound and a specific ultraviolet absorbing agent may cause both of the photochromic compound and the ultraviolet absorbing agent to co-exist in a polymerizable composition, such that a resin that can be obtained by curing the polymerizable composition sufficiently exhibits a photochromic performance and an ultraviolet cutting function together, so as to complete the present invention.

That is, the present invention can be provided below.

[1] A polymerizable composition for an optical material, including:

a monomer mixture (A) including a polymerizable monomer having a (meth)acrylic group;

a photochromic compound (B) which is at least one selected from compounds represented by Formulae (1) and (2); and an ultraviolet absorbing agent (C) which is at least one selected from compounds represented by Formulae (a) to (c), PC-L-Chain                                        (1)

PC-L-Chain-L'-PC'                        (2)

wherein in Formula (1) or (2), PC and PC' represent monovalent groups derived from compounds of Formulae (3) to (6), and PC and PC' may be identical to or different from each other,

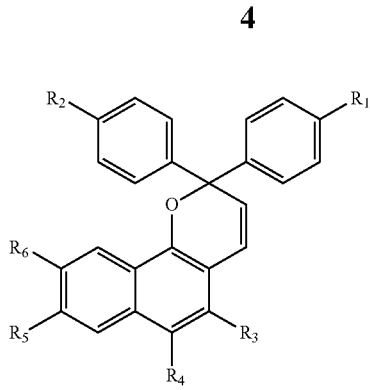

(3)

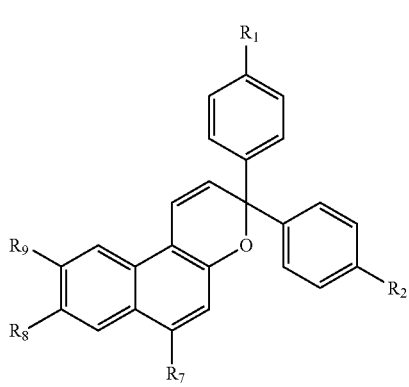

(4)

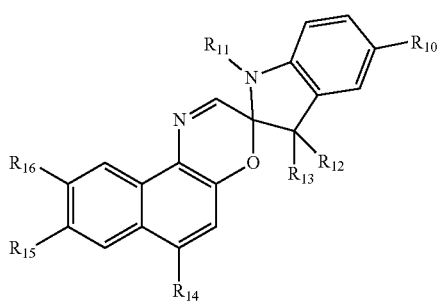

(5)

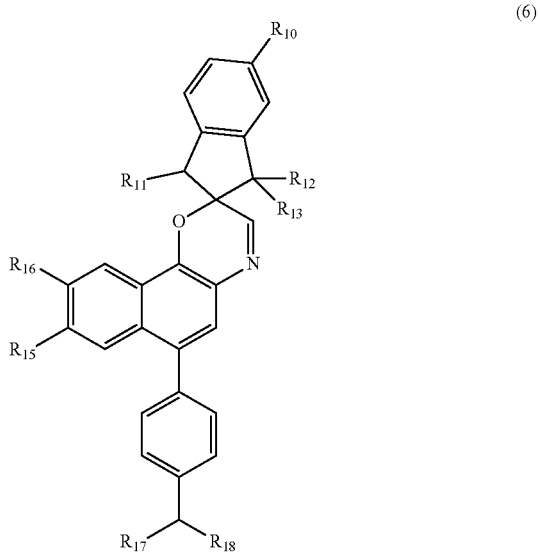

(6)

in Formulae (3) to (6), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom and a nitrogen atom, and any one group included in the compounds represented by Formulae (3) to (6) is bonded to L or L' which is a divalent organic group;

in Formula (1) or (2), L and L' each represent a divalent organic group including one or more selected from an oxyethylene chain, an oxypropylene chain, a (thio) ester group, and a (thio) amide group, and in Formula (1) or (2), Chain represents a monovalent or divalent organic group including one or more selected from a polysiloxane chain and a polyoxyalkylene chain;

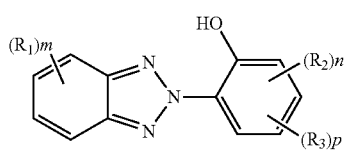

(a)

in Formula (a), $R_1$ and $R_2$ each represent a C1 to C8 alkyl group or a halogen atom and may be identical to or different from each other, a plurality of $R_1$'s existing together or a plurality of $R_2$'S existing together may be identical to or different from each other, and m represents an integer of 0 to 3, n represents an integer of 0 to 3, p represents an integer of 0 or 1, and $R_3$ represents a linear or branched C1 to C15 hydrocarbon group including an ester bond;

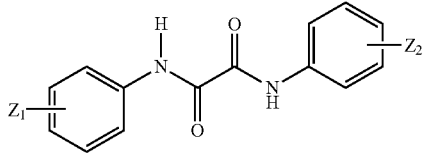

(b)

in Formula (b), $Z_1$ and $Z_2$ may be identical to or different from each other, and represent a C1 to C6 alkyl group and a C1 to C6 alkoxy group;

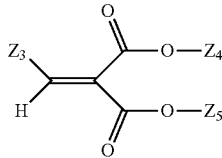

(c)

in Formula (c), $Z_3$ represents an optionally substituted C6 to C20 aromatic organic group and an optionally substituted C5 to C20 alicyclic group, and $Z_4$ and $Z_5$ may be identical to or different from each other and represent a C1 to C6 alkyl group and a C1 to C6 alkoxy group.

[2] The polymerizable composition for an optical material according to [1],
wherein the monomer mixture (A) including a polymerizable monomer having a (meth)acrylic group includes at least two selected from compounds represented by Formulae (i), (ii), (iii), and (iv),

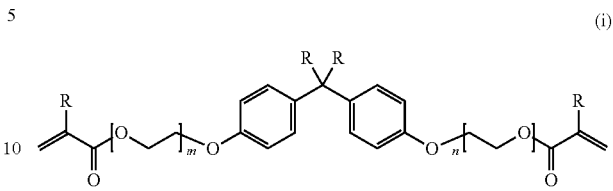

(i)

in the formula (i), R represents a hydrogen atom or a methyl group, and a plurality of R's existing together may be identical to or different from each other, and m and n represent an integer of 0 to 20 and may be identical to or different from each other;

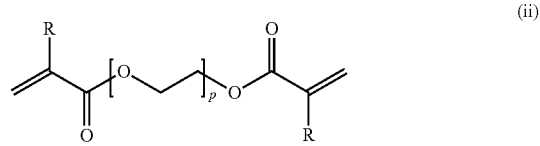

(ii)

in the formula (ii), R represents a hydrogen atom or a methyl group, and a plurality of R's existing together may be identical to or different from each other, and p represents an integer of 0 to 20;

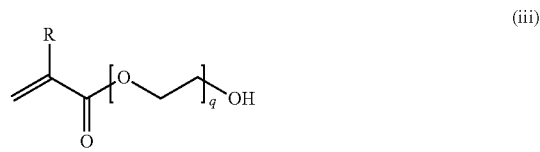

(iii)

in the formula (iii), R represents a hydrogen atom or a methyl group, and q represents an integer of 0 to 20;

(iv)

[3] The polymerizable composition for an optical material according to [1] or [2], in which the ultraviolet absorbing agent (C) is at least one selected from 2-(2-hydroxy-5-t-octylphenyl) benzotriazole, 2-(2-hydroxy-5-t-butylphenyl) benzotriazole, 2-(2-hydroxy-5-methylphenyl) benzotriazole, 2-ethyl-2'-ethoxyoxanilide, and dimethyl (p-methoxybenzylidene) malonate.

[4] A molded product obtained by curing the polymerizable composition for an optical material according to any one of [1] to [3].

[5] An optical material formed of the molded product according to [4].

[6] A plastic lens formed of the molded product according to [4].

[7] A plastic polarized lens including:
a polarizing film; and
a substrate layer formed of the molded product according to [4] formed on at least one surface of the polarizing film.

[8] A method of manufacturing a plastic lens, including:
a step of collectively mixing a monomer mixture (A) including a polymerizable monomer having a (meth)acrylic group, a photochromic compound (B) which is at least one selected from compounds represented by Formulae (1) and (2), and an ultraviolet absorbing agent (C) which is at least one selected from the compounds represented by Formulae (a) to (c) to prepare a polymerizable composition for an optical material; and
a step of performing cast polymerization on the polymerizable composition for an optical material to form a lens substrate, PC-L-Chain (1)

PC-L-Chain-L'-PC' (2)

wherein in Formula (1) or (2), PC and PC' represent monovalent groups derived from compounds of Formulae (3) to (6), and PC and PC' may be identical to or different from each other,

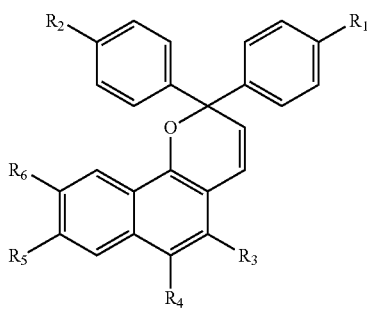
(3)

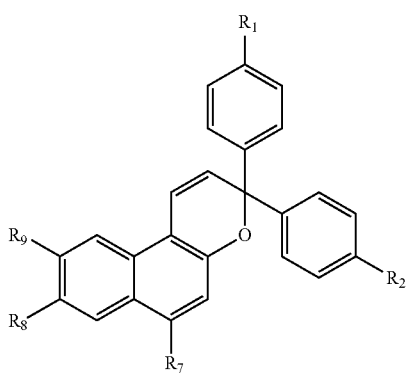
(4)

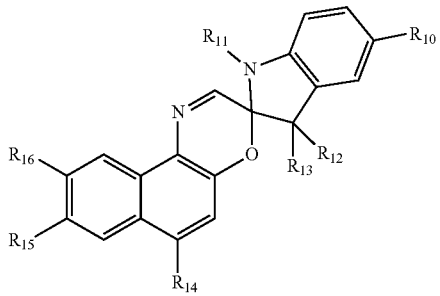
(5)

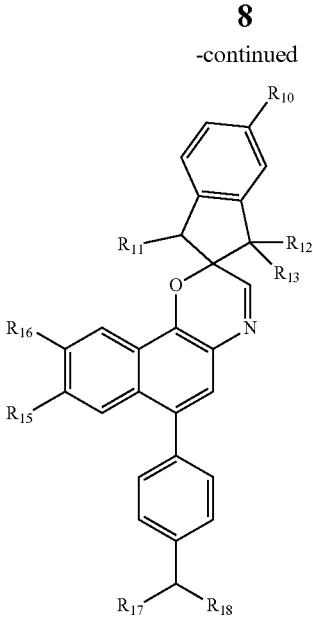
(6)

in Formulae (3) to (6), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom and a nitrogen atom, and any one group included in the compounds represented by Formulae (3) to (6) is bonded to L or L' which is a divalent organic group;

in Formula (1) or (2), L and L' each represent a divalent organic group including one or more selected from an oxyethylene chain, an oxypropylene chain, a (thio) ester group, and a (thio) amide group, and in Formula (1) or (2), Chain represents a monovalent or divalent organic group including one or more selected from a polysiloxane chain and a polyoxyalkylene chain;

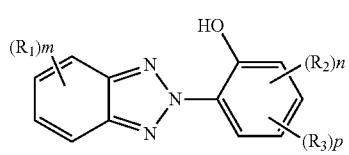
(a)

in Formula (a), $R_1$ and $R_2$ each represent a C1 to C8 alkyl group or a halogen atom and may be identical to or different from each other, a plurality of $R_1$'s existing together or a plurality of $R_2$'s existing together may be identical to or different from each other, and m represents an integer of 0 to 3, n represents an integer of 0 to 3, p represents an integer of 0 or 1, and $R_3$ represents a linear or branched C1 to C15 hydrocarbon group including an ester bond;

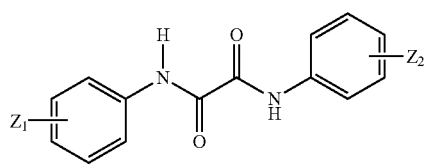

(b)

in Formula (b), $Z_1$ and $Z_2$ may be identical to or different from each other, and represent a C1 to C6 alkyl group and a C1 to C6 alkoxy group;

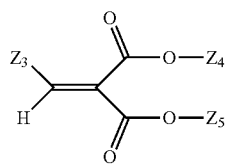

(c)

in Formula (c), $Z_3$ represents an optionally substituted C6 to C20 aromatic organic group and an optionally substituted C5 to C20 alicyclic group, and $Z_4$ and $Z_5$ may be identical to or different from each other and represent a C1 to C6 alkyl group and a C1 to C6 alkoxy group.

[9] A method of manufacturing a plastic polarized lens, including:

a step of collectively mixing a monomer mixture (A) including a polymerizable monomer having a (meth) acrylic group, a photochromic compound (B) which is at least one selected from compounds represented by Formulae (1) and (2), and an ultraviolet absorbing agent (C) which is at least one selected from the compounds represented by Formulae (a) to (c) to prepare a polymerizable composition for an optical material;

a step of fixing a polarizing film to a lens casting mold in a state of being separated from the mold;

a step of injecting the polymerizable composition for an optical material to at least one of cavities formed between the polarizing film and the mold; and a step of polymerizing and curing the polymerizable composition for an optical material and laminating a substrate layer on at least one surface of the polarizing film, PC-L-Chain (1)

PC-L-Chain-L'-PC' (2)

wherein in Formula (1) or (2), PC and PC' represent monovalent groups derived from compounds of Formulae (3) to (6), and PC and PC' may be identical to or different from each other,

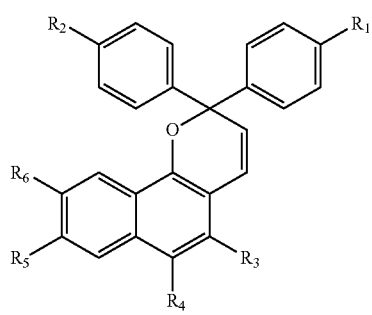

(3)

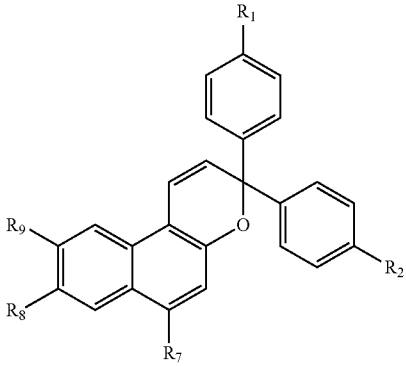

(4)

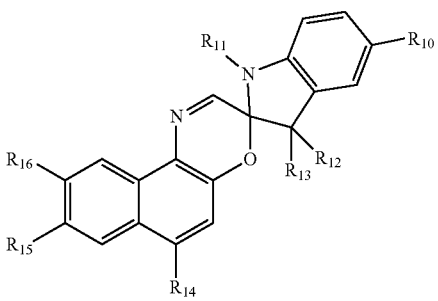

(5)

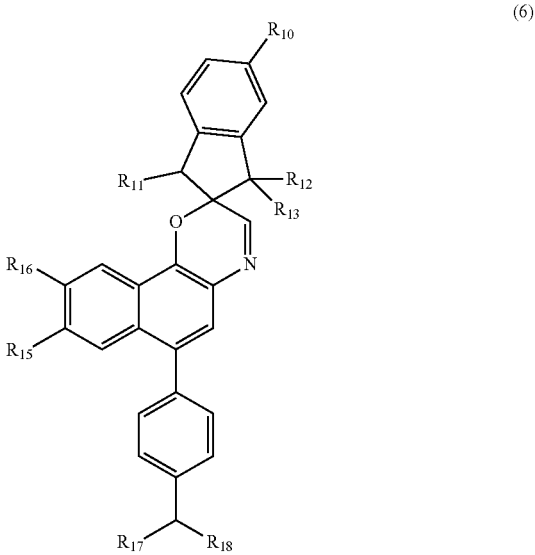

(6)

in Formulae (3) to (6), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom and a nitrogen atom, and any one group included in the compounds represented by Formulae (3) to (6) is bonded to L or L' which is a divalent organic group;

in Formula (1) or (2), L and L' each represent a divalent organic group including one or more selected from an oxyethylene chain, an oxypropylene chain, a (thio) ester group, and a (thio) amide group, and in Formula (1) or (2), Chain represents a monovalent or divalent organic group including one or more selected from a polysiloxane chain and a polyoxyalkylene chain;

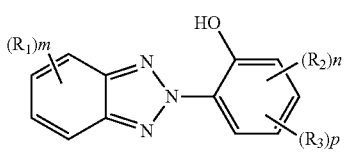
(a)

in Formula (a), $R_1$ and $R_2$ each represent a C1 to C8 alkyl group or a halogen atom and may be identical to or different from each other, and a plurality of $R_1$'s existing together or a plurality of $R_2$'S existing together may be identical to or different from each other, and m represents an integer of 0 to 3, n represents an integer of 0 to 3, p represents an integer of 0 or 1, and $R_3$ represents a linear or branched C1 to C15 hydrocarbon group including an ester bond;

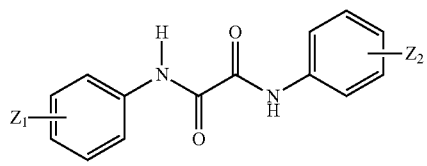
(b)

in Formula (b), $Z_1$ and $Z_2$ may be identical to or different from each other, and represent a C1 to C6 alkyl group and a C1 to C6 alkoxy group;

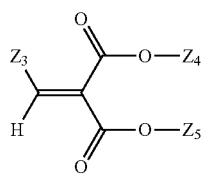
(c)

in Formula (c), $Z_3$ represents an optionally substituted C6 to C20 aromatic organic group and an optionally substituted C5 to C20 alicyclic group, and $Z_4$ and $Z_5$ may be identical to or different from each other and represent a C1 to C6 alkyl group and a C1 to C6 alkoxy group.

Advantageous Effects of Invention

In the polymerizable composition for an optical material of the present invention, even in a case where an ultraviolet absorbing agent and a photochromic compound are caused to co-exist on the same layer, a photochromic performance with high photoresponsivity and an ultraviolet cutting function are exhibited together, that is, it is possible to provide a plastic spectacle lens and a polarized lens having excellent balance between these characteristics.

In the polymerizable composition for an optical material of the present invention, an optical material including an ultraviolet absorbing agent and a photochromic compound on the same layer can be obtained, there is no need to separately form a layer including an ultraviolet absorbing agent and a layer including a photochromic compound, and thus manufacturing stability of the optical material is excellent.

DESCRIPTION OF EMBODIMENTS

The polymerizable composition for an optical material of the present invention is described with reference to the following embodiment.

The polymerizable composition for an optical material of the present embodiment includes a monomer mixture (A) including a polymerizable monomer having a (meth)acrylic group, a photochromic compound (B) which is at least one selected from compounds represented by Formulae (1) and (2), and an ultraviolet absorbing agent (C) which is at least one selected from the compounds represented by Formulae (a) to (c).

The polymerizable composition for an optical material of the present embodiment can sufficiently exhibit a photochromic performance and an ultraviolet cutting function in an acrylic resin by using components (A) to (C) as below in combination.

Hereinafter, respective components are described.

[Monomer Mixture (A) Including Polymerizable Monomer Having (Meth)Acrylic Group]

The monomer mixture (A) includes at least two selected from compounds represented by Formulae (i), (ii), (iii), and (iv).

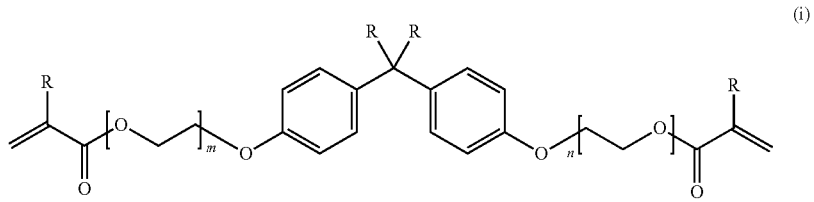
(i)

In the formula (i), R represents a hydrogen atom or a methyl group, and a plurality of R's existing together may be identical to or different from each other. m and n represent an integer of 0 to 20 and may be identical to or different from each other.

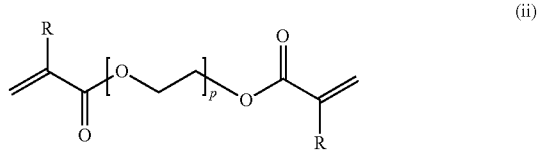
(ii)

In the formula (ii), R represents a hydrogen atom or a methyl group, and a plurality of R's existing together may be identical to or different from each other. p represents an integer of 0 to 20.

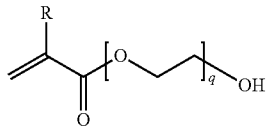
(iii)

In the formula (iii), R represents a hydrogen atom or a methyl group, and q represents an integer of 0 to 20.

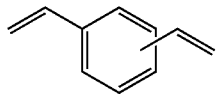
(iv)

Examples of the polymerizable monomer having a (meth) acrylic group represented by Formula (i) include bisphenol A dimethacrylate, methylene-bis-(4,1-phenylene)-bis-(2-methacrylate), bisphenol A diacrylate, methylene-bis-(4,1-phenylene)-bis-(2-acrylate), 2,2-bis-(4-methacryloyloxyphenyl) propane, 2,2-bis-(4-acryloyloxyphenyl) propane, 2-(4-methacryloyloxyphenyl)-2-(4-methacryloyloxyethoxyphenyl) propane, 2-(4-acryloyloxyphenyl)-2-(4-acryloyloxyethoxyphenyl) propane, 2,2-bis-(4-methacryloyloxyethoxyphenyl) propane, 2,2-bis-(4-acryloyloxyethoxyphenyl) propane, 2-(4-methacryloyloxyethoxyphenyl)-2-(4-(methacryloyloxyethoxy) ethoxyphenyl) propane, 2-(4-acryloyloxyethoxyphenyl)-2-(4-(acryloyloxyethoxy) ethoxyphenyl) propane, 2,2-bis-(4-(methacryloyloxyethoxy) ethoxyphenyl) propane, and 2,2-bis-(4-(acryloyloxyethoxy) ethoxyphenyl) propane.

The polymerizable monomer having a (meth)acrylic group represented by Formula (ii) include ethylene glycol dimethacrylate, diethylene glycol dimethacrylate, triethylene glycol dimethacrylate, tetraethylene glycol dimethacrylate, ethylene glycol diacrylate, diethylene glycol diacrylate, triethylene glycol diacrylate, and tetraethylene glycol diacrylate.

The polymerizable monomer having a (meth)acrylic group represented by Formula (iii) include methacrylic acid, acrylic acid, 2-hydroxyethyl methacrylate, 2-hydroxyethyl acrylate, 2-(2-hydroxyethoxy) ethyl methacrylate, and 2-(2-hydroxyethoxy) ethyl acrylate.

Examples of other polymerizable monomer having a (meth) acrylic group include one or two or more compounds selected from the group consisting of butanediol dimethacrylate, hexamethylene dimethacrylate, 2,2-bis(4-methacryloyloxyethoxy-3,5-dibromophenyl) propane, 2,2-bis-(4-methacryloyloxypentaethoxyphenyl) propane, pentaerythritol triacrylate, pentaerythritol tetraacrylate, trimethylolpropane triacrylate, dipentaerythritol hexaacrylate, bisphenol A-diglycidyl ether diacrylate type, bisphenol A-diglycidyl ether dimethacrylate type, tetrabromobisphenol A-diglycidyl ether diacrylate type, and tetrabromobisphenol A-diglycidyl ether dimethacrylate.

Examples of the monomer (excluding a compound represented by Formula (iv)) other than a polymerizable monomer having a (meth)acrylic group include one or two or more compounds selected from the group consisting of styrene, alpha methyl styrene, alpha methyl styrene dimer, benzyl methacrylate, chlorostyrene, bromostyrene, methoxystyrene, monobenzyl malic acid, dibenzyl malic acid, monobenzyl fumarate, dibenzyl fumarate, methylbenzylmalic acid, dimethyl malic acid, diethyl malic acid, dibutyl malic acid, dibutyl fumarate, monobutyl malic acid, monopentyl malic acid, dipentyl malic acid, monopentyl fumarate, dipentyl fumarate, and diethylene glycol bisaryl carbonate.

The content of the polymerizable monomer represented by Formula (i) is 20 to 70 weight % and preferably 30 to 60 weight % with respect to 100 weight % of the monomer mixture (A), the content of the polymerizable monomer represented by Formula (ii) is 10 to 60 weight % and preferably 20 to 50 weight %, the content of the polymerizable monomer represented by Formula (iii) is 2 to 20 weight % and preferably 5 to 15 weight %, and the content of the compound represented by Formula (iv) is 1 weight % to 20 weight %, preferably 3 weight % to 15 weight %, and more preferably 5 weight % to 10 weight %.

In a case where the (A) to (C) components are combined by using the component (A) included in the above range, both of the photochromic performance and the ultraviolet cutting function can be effectively exhibited. The numerical range can be suitably combined.

Examples of the monomer mixture (A) including a polymerizable monomer having a (meth) acrylic group include SSS-55 MONOMER as a trade name.

[Photochromic Compound (B)]

According to the present embodiment, at least one selected from compounds represented by Formulae (1) and (2) can be used as the photochromic compound (B).

PC-L-Chain (1)

PC-L-Chain-L'-PC' (2)

PC and PC' represent monovalent groups derived from a compound of Formulae (3) to (6). PC and PC' may be identical to or different from each other.

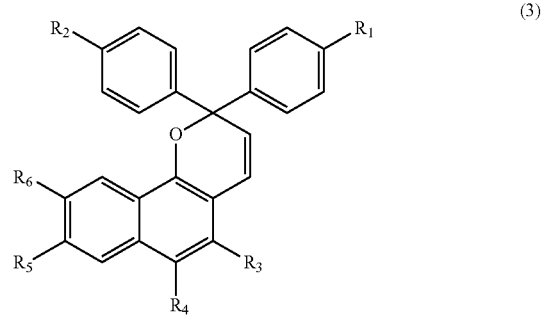
(3)

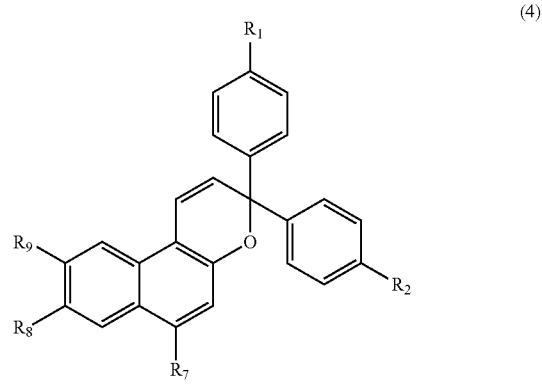
(4)

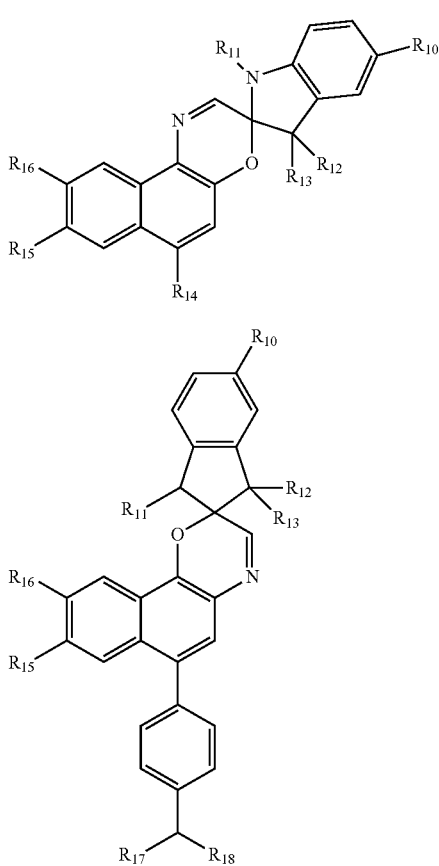

In Formulae (3) to (6), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other. The aliphatic group, the alicyclic group, or the aromatic organic group may contain an oxygen atom and a nitrogen atom. Any one group included in the compounds represented by Formulae (3) to (6) is bonded to L or L' which is a divalent organic group.

Examples of the optionally substituted C1 to C20 aliphatic group include a linear or branched C1 to C10 alkyl group, a linear or branched C1 to C10 alkoxy group, a linear or branched C2 to C10 alkenyl group, a C1 to C10 hydroxyalkyl group, a C1 to C10 hydroxyalkoxy group, a C1 to C10 alkyl group substituted with a C1 to C10 alkoxy group, a C1 to C10 alkoxy group substituted with a C1 to C10 alkoxy group, a C1 to C5 haloalkyl group, a C1 to C5 dihaloalkyl group, a C1 to C5 trihaloalkyl group, a C1 to C10 alkylamino group, a C1 to C10 aminoalkyl group, and a linear or branched C1 to C20 alkoxycarbonyl group.

Examples of the optionally substituted C3 to C20 alicyclic group include a C3 to C20 cycloalkyl group and a C6 to C20 bicycloalkyl group.

Examples of the optionally substituted C6 to C20 aromatic organic group include a phenyl group, a C7 to C16 alkoxyphenyl group, an arylamino group, a diarylamino group, an aryl C1 to C5 alkylamino group, a cyclic amino group, an arylcarbonyl group, and an aroyl group.

$R_1$ and $R_2$ each preferably include a hydrogen atom; a halogen atom; a linear or branched C1 to C10 alkyl group, a linear or branched C1 to C10 alkoxy group, a C1 to C10 hydroxyalkoxy group, a C1 to C10 alkoxy group substituted with a C1 to C10 alkoxy group, a C1 to C5 haloalkyl group, a C1 to C5 dihaloalkyl group, a C1 to C5 trihaloalkyl group, a C1 to C5 alkylamino group, and an optionally substituted C1 to C20 aliphatic group; and an optionally substituted C6 to C20 aromatic organic group such as a phenyl group, a C7 to C16 alkoxyphenyl group, a C1 to C5 dialkylamino group, an arylamino group, a diarylamino group, an aryl C1 to C5 alkylamino group, and a cyclic amino group. $R_1$ and $R_2$ may be identical to or different from each other.

Examples of $R_3$ preferably include a hydrogen atom; a halogen atom; a carboxyl group; an acetyl group; an optionally substituted C1 to C20 aliphatic group such as a linear or branched C1 to C10 alkyl group, a linear or branched C2 to C10 alkenyl group, a linear or branched C1 to C10 alkoxy group, a C1 to C10 hydroxyalkyl group, a C1 to C10 alkyl group substituted with a C1 to C10 alkoxy group, a C1 to C10 aminoalkyl group, and a linear or branched C1 to C20 alkoxycarbonyl group;

an optionally substituted C3 to C20 alicyclic group such as a C3 to C20 cycloalkyl group and a C6 to C20 bicycloalkyl group; and an optionally substituted C6 to C20 aromatic organic group such as an arylcarbonyl group, a formyl group, and an aroyl group.

Examples of $R_4$ preferably include a hydrogen atom; a halogen atom; a carboxyl group; an acetyl group; a formyl group;

an optionally substituted C1 to C20 aliphatic group such as a linear or branched C1 to O10 alkyl group, a linear or branched C2 to C10 alkenyl group, a linear or branched C1 to C10 alkoxy group, a C1 to C10 hydroxyalkyl group, a C1 to C10 alkyl group substituted with a C1 to C10 alkoxy group, a C1 to C10 aminoalkyl group, and a linear or branched C1 to C20 alkoxycarbonyl group;

an optionally substituted C3 to C20 alicyclic group such as a C3 to C20 cycloalkyl group and a C6 to C20 bicycloalkyl group; and an optionally substituted C6 to C20 aromatic organic group such as an arylcarbonyl group, an aroyl group, a phenyl group, a C7 to C16 alkoxyphenyl group, a C1 to C10 dialkoxyphenyl group, a C1 to C10 alkylphenyl group, and a C1 to C10 dialkylphenyl group.

$R_3$ and $R_4$ may be bonded to each other. In a case where $R_3$ and $R_4$ are bonded to each other to form a ring structure, examples thereof include Formula (7) or (8). A dotted line portion represents a bond between a carbon atom to which $R_3$ is bonded and a carbon atom to which $R_4$ is bonded.

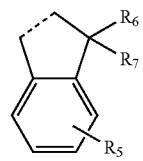

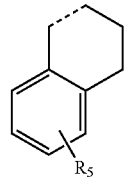

$R_5$, $R_6$, $R_7$, $R_8$, $R_9$, $R_{10}$, $R_{14}$, $R_{15}$, and $R_{16}$ represent functional groups as in $R_1$ and $R_2$. A plurality of $R_5$ to $R_7$ existing together may be identical to or different from each other.

$R_{11}$ preferably includes a hydrogen atom; a halogen atom;

an optionally substituted C1 to C20 aliphatic group such as a linear or branched C1 to C20 alkyl group, a C1 to C5 haloalkyl group, a C1 to C5 dihaloalkyl group, and a C1 to C5 trihaloalkyl group;

an optionally substituted C3 to C20 alicyclic group such as a C3 to C20 cycloalkyl group, a C6 to C20 bicycloalkyl group, a C3 to C20 cycloalkyl group substituted with a C1 to C5 alkyl group, and a C6 to C20 bicycloalkyl group substituted with a C1 to C5 alkyl group; and an optionally substituted C6 to C20 aromatic organic group such as an aryl group which is substituted with a C1 to C5 alkyl group.

$R_{12}$ and $R_{13}$ each preferably include a hydrogen atom; a halogen atom;

an optionally substituted C1 to C20 aliphatic group such as a C1 to C10 alkyl group and a C1 to C5 alkylalkoxycarbonyl group; and an optionally substituted C3 to C20 alicyclic group such as a C5 to C7 cycloalkyl group.

$R_{17}$ and $R_{18}$ each preferably include a hydrogen atom; a halogen atom;

an optionally substituted C1 to C20 aliphatic group such as a linear or branched C1 to C10 alkyl group and a C1 to C10 hydroxyalkyl group; and an optionally substituted C3 to C20 alicyclic group such as a C5 to C7 cycloalkyl group.

In Formula (1) or (2), L and L' each represent a divalent organic group including one or more selected from an oxyethylene chain, an oxypropylene chain, a (thio)ester group, and a (thio)amide group.

Specifically, L and L' are represented by Formula (9) to (15). L and L' may be identical to or different from each other.

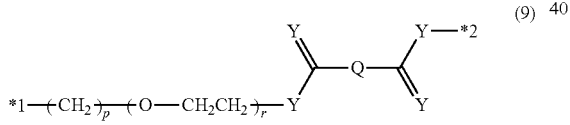

(9)

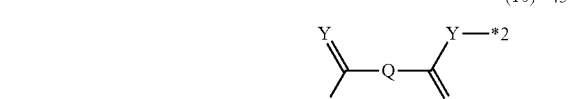

(10)

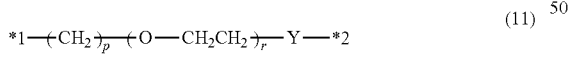

(11)

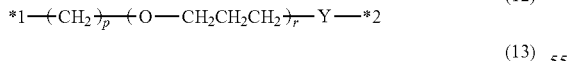

(12)

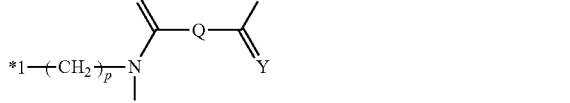

(13)

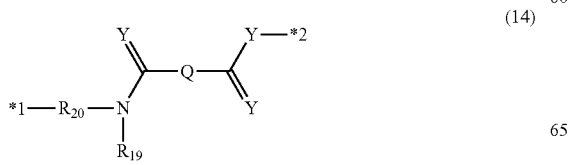

(14)

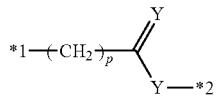

(15)

In Formulae (9) to (15),

Y represents oxygen and sulfur.

$R_{19}$ represents hydrogen and a linear or branched C1 to C10 alkyl group.

$R_{20}$ represents a linear or branched C1 to C10 alkyl group.

p represents an integer of 0 to 15, and r represents an integer of 0 to 10.

Q represents a divalent group derived from a linear or branched

C1 to C10 alkylene group, a C1 to C10 alkenylene group, and a substituted aryl group at the 1,2-, 1,3-, and 1,4- position, and a divalent group derived from a substituted heteroaryl group.

*1 and *2 each represent a bond, *1 is bonded to a monovalent or divalent organic group represented by "Chain", and *2 is bonded to a monovalent organic group represented by PC or PC'.

In Formula (1) or (2), "Chain" represents a monovalent or divalent organic group including one or more selected from a polysiloxane chain and a polyoxyalkylene chain.

Examples of the polysiloxane chain include a polydimethylsiloxane chain, a polymethylphenylsiloxane chain, and a polymethylhydrosiloxane chain.

Examples of the polyoxyalkylene chain include a polyoxyethylene chain, a polyoxypropylene chain, and a polyoxyhexamethylene chain.

Specifically, in a case where the photochromic compound is Formula (1), "Chain" represents a monovalent organic group of Formula (16) or (17).

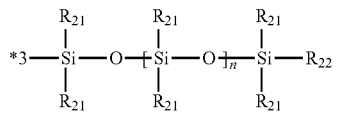

(16)

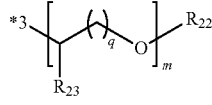

(17)

In a case where the photochromic compound is Formula (2), "Chain" represents a divalent organic group of Formula (18) or (19).

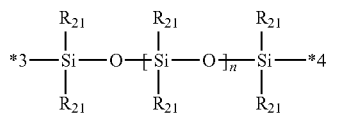

(18)

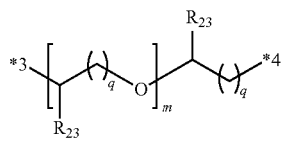

(19)

In Formulae (16) to (19), $R_{21}$ represents a linear or branched C1 to C10 alkyl group.

$R_{22}$ represents a linear or branched C1 to C10 alkyl group.

$R_{23}$ represents hydrogen, a methyl group, and an ethyl group.

n represents an integer of 4 to 75, and m represents an integer of 1 to 50.

q represents an integer of 1 to 3.

*3 and *4 each represent a bond, *3 is bonded to a divalent organic group represented by L, and *4 is bonded to a divalent organic group represented by L'.

The photochromic compound of the present invention can be obtained by methods disclosed in WO2009/146509, WO2010/20770, WO2012/149599, and WO2012/162725.

Examples of the photochromic compound according to the present invention include Reversacol Humber Blue (a polydimethylsiloxane chain, naphthopyran-based chromophore (Formula 3)) manufactured by Vivimed Labs Ltd., Reversacol Calder Blue (a polydimethylsiloxane chain, a naphthopyran-based chromophore (Formula 3)), Reversacol Trent Blue (a polydimethylsiloxane chain, a naphthopyran-based chromophore (Formula 3)), Reversacol Pennine Green (a polydimethylsiloxane chain, a naphthopyran-based chromophore (Formula 3)), Reversacol Heath Green (a polyoxyalkylene chain, a naphthopyran-based chromophore (Formula 3)), Reversacol Chilli Red (a polydimethylsiloxane chain, a naphthopyran-based chromophore (Formula 3)), Reversacol Wembley Grey (polyoxyalkylene chain, a naphthopyran-based chromophore (Formula 3)), and Reversacol Cayenne Red (polyoxyalkylene chain, a naphthopyran-based chromophore (Formula 3)).

[Ultraviolet Absorbing Agent (C)]

According to the present embodiment, at least one selected from compounds represented by Formulae (a) to (c) is used as an ultraviolet absorbing agent (C).

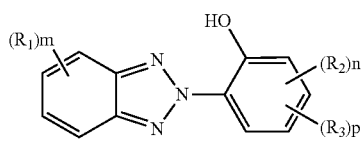

(a)

In Formula (a), $R_1$ and $R_2$ each represent a C1 to C8 alkyl group or a halogen atom and may be identical to or different from each other. A plurality of $R_1$'s existing together or a plurality of $R_2$'s existing together may be identical to or different from each other. m represents an integer of 0 to 3, n represents an integer of 0 to 3, and p represents an integer of 0 or 1. $R_3$ represents a linear or branched C1 to C15 hydrocarbon group including an ester bond, and preferably represents a linear or branched C1 to C8 alkyl group including an ester bond.

The ultraviolet absorbing agent represented by Formula (a) is preferably at least one selected from the group consisting of 2-(2-hydroxy-5-t-octylphenyl) benzotriazole, 2-(2-hydroxy-5-t-butylphenyl) benzotriazole, 2-(2-hydroxy-5-methylphenyl) benzotriazole, 2-(5-t-octyl-3-(phenylpropan-2-yl)-2-hydroxyphenyl) benzotriazole, 2-(5-t-butyl-3-(phenylpropan-2-yl)-2-hydroxyphenyl) benzotriazole, 2-(5-methyl-3-(phenylpropan-2-yl)-2-hydroxyphenyl) benzotriazole, 2-(5-octylpropionate-2-hydroxyphenyl) benzotriazole, 2-(5-t-octyl-2-hydroxyphenyl) benzotriazole, 2-(3,5-di-t-butyl-2-hydroxyphenyl) benzotriazole, 2-(3,5-di-t-pentyl-2-hydroxyphenyl) benzotriazole, 2-(3,5-bis-(phenylpropan-2-yl)-2-hydroxyphenyl) benzotriazole, 2-(3,5-di-t-butyl-2-hydroxyphenyl)-5-chlorobenzotriazole, 2-(4-octyloxy-2-hydroxyphenyl) benzotriazole, 2-(5-methyl-3-n-dodecyl-2-hydroxyphenyl) benzotriazole, 2-(5-methyl-2-hydroxyphenyl) benzotriazole, and 2-(5-t-butyl-2-hydroxyphenyl) benzotriazole.

The ultraviolet absorbing agent is at least one selected from the group more preferably consisting of 2-(2-hydroxy-5-t-octylphenyl) benzotriazole, 2-(2-hydroxy-5-t-butylphenyl) benzotriazole, 2-(2-hydroxy-5-methylphenyl) benzotriazole, 2-(5-t-octyl-3-(phenylpropan-2-yl)-2-hydroxyphenyl) benzotriazole, 2-(5-t-butyl-3-(phenylpropan-2-yl)-2-hydroxyphenyl) benzotriazole, 2-(5-methyl-3-(phenylpropan-2-yl)-2-hydroxyphenyl) benzotriazole, 2-(5-octylpropionate-2-hydroxyphenyl) benzotriazole, 2-(3,5-di-t-pentyl-2-hydroxyphenyl) benzotriazole, 2-(3,5-bis-(phenylpropan-2-yl)-2-hydroxyphenyl) benzotriazole, 2-(3,5-di-t-butyl-2-hydroxyphenyl)-5-chlorobenzotriazole, and 2-(4-octyloxy-2-hydroxyphenyl) benzotriazole, even more preferably consisting of 2-(2-hydroxy-5-t-octylphenyl) benzotriazole, 2-(2-hydroxy-5-t-butylphenyl) benzotriazole, 2-(2-hydroxy-5-methylphenyl) benzotriazole, 2-(5-t-octyl-3-(phenylpropan-2-yl)-2-hydroxyphenyl) benzotriazole, 2-(5-t-butyl-3-(phenylpropan-2-yl)-2-hydroxyphenyl) benzotriazole, and 2-(5-methyl-3-(phenylpropan-2-yl)-2-hydroxyphenyl) benzotriazole, and particularly preferably consisting of 2-(2-hydroxy-5-t-octylphenyl) benzotriazole, 2-(2-hydroxy-5-t-butylphenyl) benzotriazole, and 2-(2-hydroxy-5-methylphenyl) benzotriazole.

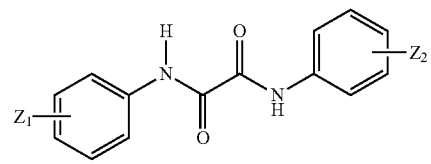

(b)

In Formula (b), $Z_1$ and $Z_2$ may be identical to or different from each other, and examples thereof include a C1 to C6 alkyl group and a C1 to C6 alkoxy group.

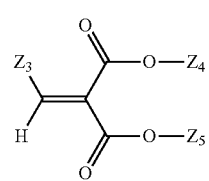

(c)

In Formula (c), examples of $Z_3$ include an optionally substituted C6 to C20 aromatic organic group and an optionally substituted C5 to C20 alicyclic group, $Z_4$ and $Z_5$ may be identical to or different from each other, and examples thereof include a C1 to C6 alkyl group and a C1 to C6 alkoxy group.

Examples of the C6 to C20 aromatic organic group include a phenyl group, a benzyl group, a benzoyl group, and a p-methoxybenzyl group. Examples of the C5 to C20 alicyclic group include a cyclopentyl group, a cyclohexyl group, a cycloheptyl group, a cyclooctyl group, a cyclopentanyl group, and a cyclodecanyl group.

Examples of a substituent of the substituted C6 to C20 aromatic organic group or a substituent of the substituted C5 to C20 alicyclic group include a C1 to C6 alkyl group or a C1 to C6 alkoxy group.

In Formula (b) or (c), examples of the C1 to C6 alkyl group include a methyl group, an ethyl group, a butyl group, a propyl group, a pentyl group, and a hexyl group, and examples of the C1 to C6 alkoxy group include a methoxy group, an ethoxy group, a butoxy group, and a phenoxy group.

Examples of the compound represented by Formula (b) include 2-ethyl-2'-ethoxyoxanilide. Examples of the compound represented by Formula (c) include dimethyl (p-methoxybenzylidene) malonate.

According to the present embodiment, it is particularly preferable that at least one selected from 2-(2-hydroxy-5-t-octylphenyl) benzotriazole, 2-(2-hydroxy-5-t-butylphenyl) benzotriazole, 2-(2-hydroxy-5-methylphenyl) benzotriazole, 2-ethyl-2'-ethoxyoxanilide, and dimethyl (p-methoxybenzylidene) malonate is used in the ultraviolet absorbing agent (C).

According to the present embodiment, in view of the effect of the present invention, the content of the photochromic compound (B) is in the range of 10 ppm to 10,000 ppm, is in the range of 50 pm to 5,000 ppm, and more preferably is in the range of 100 ppm to 3,000 ppm with respect to the sum of the mixture (A) of the polymerizable monomer having the (meth) acrylic group.

In view of the effect of the present invention, the content of the ultraviolet absorbing agent (C) is in the range of 10 ppm to 20,000 ppm, is in the range of 20 ppm to 5,000 ppm, and more preferably is in the range of 20 ppm to 3,000 ppm with respect to the sum of the mixture (A) of the polymerizable monomer having the (meth) acrylic group.

[Other Components]

According to the present embodiment, a polymerization catalyst, an internal release agent, a resin modifier, and the like may be further included, in addition to the above the components (A) to (C).

Examples of the polymerization catalyst include a peroxyester-based radical polymerization initiator, a peroxyketal-based radical polymerization initiator, or an azo-based radical polymerization initiator, as a radical polymerization initiator.

In order to cure a monomer composition for manufacturing the optical material in the manufacturing method according to the present invention, a radical polymerization initiator is added to the monomer composition, and the monomer composition is cured by a heat curing method or an active energy ray curing method, so as to obtain the optical material.

In a case where the monomer composition is cured by using these radical polymerization initiators, decomposition of the photochromic compound in a case of curing is prevented. In a case where polyol, polythiol, polyisocyanate, and the like are further included, coloration in a case of curing can be suppressed.

Examples of the peroxyester-based radical polymerization initiator include t-hexyl peroxyneodecanoate, 1,1,3,3-tetramethylbutyl peroxyneodecanoate, t-hexylperoxy-2-ethylhexanoate, 1-cyclohexyl-1-methylethyl peroxyneodecanoate, cumyl peroxyneodecanoate, t-butylperoxy-2-ethylhexanoate, t-butyl peroxypivalate, t-hexyl peroxypivalate, t-butyl peroxyneodecanoate, t-butyl peroxyisobutyrate, t-butyl peroxylaurate, and t-butylperoxy nonanoate.

The peroxyketal-based radical polymerization initiator is preferably 1,1-bis(t-hexylperoxy) cyclohexane, 1,1-bis(t-butylperoxy) cyclohexane, di-t-butylperoxy-2-methylcyclohexane, and 1,1-bis(t-butylperoxy) 3,3,5-trimethylcyclohexane. The peroxyketal radical polymerization initiator is more preferably at least one selected from 1,1-bis(t-hexylperoxy) cyclohexane, 1,1-bis(t-butylperoxy) cyclohexane, and di-t-butylperoxy-2-methylcyclohexane.

Examples of the azo-based radical polymerization initiator include azobisisobutyronitrile and azobisdimethylvaleronitrile.

These may be used singly or two or more types thereof may be used in a mixture. Other radical polymerization initiators may be used in combination, if necessary.

According to the present invention, the addition amount of the radical polymerization initiator is generally in the range of 0.01 to 10 weight % and preferably in the range of 0.1 to 5 weight %, with respect to the monomer composition. In a case where the addition amount thereof is less than 0.01 weight %, curing becomes insufficient, and in a case where the addition amount thereof is greater than 10 weight %, a cured product tends to be distorted.

As the internal release agent, an acidic phosphate ester can be used. Examples of the acidic phosphate ester include phosphoric acid monoester and phosphoric acid diester, and these may be used singly or two types thereof may be used in a mixture.

Examples of the resin modifier include an episulfide compound, an alcohol compound, an amine compound, an epoxy compound, an organic acid and an anhydride thereof, an olefin compound including a (meth)acrylate compound and the like.

<Method of Manufacturing Polymerizable Composition for an Optical Material>

The polymerizable composition for an optical material of the present embodiment can be prepared by collectively mixing a monomer mixture (A) including a polymerizable monomer having a (meth) acrylic group, a photochromic compound (B) which is at least one selected from compounds represented by Formulae (1) and (2), and an ultraviolet absorbing agent (C) which is at least one selected from the compounds represented by Formulae (a) to (c).

The temperature in a case where the component (A), the component (B), the component (C), and further an additive are mixed to prepare the polymerizable composition is generally 25° C. or less. In view of the pot life of the polymerizable composition, it is preferable that the temperature may be further decreased in some cases. However, in a case where the solubility of the catalyst, the internal release agent, and the additive to the monomer is not satisfactory, it is possible to heat and dissolve the catalyst, the internal release agent, and the additive to the monomer and the resin modifier, in advance.

According to the present embodiment, the method of manufacturing the resin molded product is not particularly limited. However, examples of the preferable manufacturing method include cast polymerization. First, the polymerizable composition is injected between molded dies held by a gasket or a tape. In this case, depending on the physical properties required for the plastic lens to be obtained, in many cases, a defoaming treatment under reduced pressure, and a filtration treatment under pressurization, depressurization, and the like are preferably performed, if necessary.

The polymerization condition largely differs depending on the composition of the polymerizable composition, the kind and the use amount of the catalyst, the shape of the mold, and the like, and thus the polymerization condition is not limited. However, the polymerization is performed at the temperature of −50° C. to 150° C. and over 1 to 50 hours.

In some cases, it is preferable that the temperature is maintained or is gradually increased in a temperature range of 10° C. to 150° C., and the polymerizable composition is cured for 1 to 48 hours.

The resin molded product may be subjected to a treatment such as annealing, if necessary. With respect to the treatment temperature, the treatment is generally performed at 50° C. to 150° C., preferably performed at 90° C. to 140° C., and more preferably at 100° C. to 130° C.

According to the present embodiment, in order to mold the resin, in addition to the above "other components", in the same manner as the well-known molding method, in accordance with the purpose, various additives such as a chain extender, a crosslinking agent, a light stabilizer, an antioxidant, a blueing agent, an oil soluble dye, a filler, and an adhesiveness improver may be added.

<Application>

The acrylic resin of the present embodiment may be obtained as molded products in various shapes by changing types of the mold in a case of the cast polymerization.

The molded product obtained by curing the polymerizable composition for an optical material according to the present embodiment generally can suppress the light transmittance after the color development at 380 nm to 8% or less, preferably to 5% or less, more preferably 2% or less. The resin molded product of the present embodiment includes a photochromic performance with high photoresponsivity together with an excellent ultraviolet cutting function, further includes a high refractive index and high transparency, and thus can be used in various optical materials such as a plastic lens. Particularly, the resin molded product can be suitably used as a plastic spectacle lens or a plastic polarized lens.

The method of manufacturing the plastic lens of the present embodiment includes a step of forming a lens substrate by performing cast polymerization on the polymerizable composition for an optical material.

[Plastic Spectacle Lens]

The plastic spectacle lens using the lens substrate formed of the molded product of the present embodiment may be used by providing a coating layer on one surface or both surfaces thereof.

The plastic spectacle lens of the present embodiment is formed of a lens substrate and a coating layer formed of the polymerizable composition.

Specific examples of the coating layer include a primer layer, a hard coat layer, an antireflection layer, an anti-fog coating layer, an antifouling layer, and a water repellent layer. These coating layers may be used singly or a plurality of coating layers may be used in multilayers. In a case where coating layers are provided on the both surfaces, the same coating layer may be provided on each surface, or different coating layers may be provided on each surface.

These coating layers each contain an infrared absorbing agent for the purpose of protecting eyes from infrared rays, contain a light stabilizer, an antioxidant, and a photochromic compound for the purpose of improving the weather resistance of the lens, and contain a dye, a pigment, or an antistatic agent for the purpose of improving the fashionability of the lens, and other well-known additives may be used in combination for enhancing the performance of the lens.

With respect to the layer to be coated by application, various leveling agents for improving applicability may be used.

The primer layer is generally formed between a hard coat layer described below and the lens. The primer layer is a coating layer intended to improve the adhesiveness between the hard coat layer formed thereon and the lens and the impact resistance can be improved in some cases. Any material can be used as the primer layer as long as the material has high adhesiveness to the obtained lens, but a primer composition including a urethane-based resin, an epoxy-based resin, a polyester-based resin, a melanin-based resin, and polyvinyl acetal as main components is generally used. For the purpose of adjusting the viscosity of the composition, a suitable solvent which does not affect the lens may be used as the primer composition. It is obvious that no solvent may be used.

The primer layer can be formed by any one of a coating method or a dry method. In the case where a coating method is used, a primer layer is formed by applying the primer composition to a lens by a well-known coating method such as spin coating and dip coating and then solidifying the primer composition. In a case where a dry method is used, a primer layer is formed by a well-known dry method such as a CVD method or a vacuum evaporation method. In a case where a primer layer is formed, for the purpose of improving adhesiveness, the surface of the lens may be subjected to pretreatments such as an alkali treatment, a plasma treatment, and an ultraviolet treatment, if necessary.

The hard coat layer is a coating layer intended to provide the lens surface with functions such as scratch resistance, weather resistance, moisture resistance, hot water resistance, heat resistance, and weather fastness.

Generally, the hard coat layer is formed of an organosilicon compound having curability and a hard coat composition including one or more kinds of oxide fine particles of an element selected from the element group consisting of Si, Al, Sn, Sb, Ta, Ce, La, Fe, Zn, W, Zr, In, and Ti and/or one or more kinds of oxide fine particles formed from a composite oxide of two or more elements selected from the element groups is used.

In addition to the above components, the hard coat composition preferably includes at least any one of amines, amino acids, a metal acetylacetonate complex, organic acid metal salt, perchlorates, a salt of perchloric acids, acids, metal chloride, and a polyfunctional epoxy compound. A suitable solvent that does not affect the lens may be used for the hard coat composition, or no solvent may be used.

The hard coat layer is generally formed by applying the hard coat composition by a well-known coating method such as spin coating and dip coating and curing the hard coat composition. Examples of the curing method include heat curing and a curing method by energy ray irradiation such as an ultraviolet ray or visible light. In order to suppress the generation of interference fringes, it is preferable that the difference in refractive indexes of the hard coat layer and the lens is within a range of ±0.1.

The antireflection layer is generally formed on the hard coat layer, if necessary. The antireflection layer includes an inorganic antireflection layer and an organic antireflection layer. In a case where the antireflection layer is inorganic, an inorganic oxide such as $SiO_2$ or $TiO_2$ is used, and the antireflection layer is formed by a dry method such as a vacuum deposition method, a sputtering method, an ion plating method, an ion beam assist method, and a CVD method. In a case where the antireflection layer is organic, a composition containing an organosilicon compound and silica-based fine particles having an internal cavity is used, and the antireflection layer is formed by a wet method.

The antireflection layer has a single layer and a multiple layer. In the case where the antireflection layer is used as a single layer, it is preferable that the refractive index thereof is lower than that of the hard coat layer by at least equal to or greater than 0.1. In order to effectively exhibit an antireflection function, it is preferable to use a multilayer antireflection film. In that case, a low refractive index film and a high refractive index film are alternately laminated. In this case, a refractive index difference of the low refractive index film and the high refractive index film is preferably equal to or greater than 0.1. The high refractive index film includes a film of ZnO, $TiO_2$, $CeO_2$, $Sb_2O_5$, $SnO_2$, $ZrO_2$, $Ta_2O_5$, and the like, and the low refractive index film includes a $SiO_2$ film.

An anti-fog layer, an antifouling layer, and a water repellent layer may be formed on the antireflection layer, if necessary. With respect to the method of forming an anti-fog layer, an antifouling layer, and a water repellent layer, as long as the method does not give an adverse effect on the antireflection function, the treatment method, the treatment material, and the like are not particularly limited. Well-known antifogging treatment methods, antifouling treatment methods, water repellent treatment methods, and materials can be used. Examples of the antifogging treatment method and the antifouling treatment method include a method of covering the surface with a surfactant, a method of adding a hydrophilic film to the surface so as to cause the surface to be water absorbent, a method of covering the surface with fine irregularities so as to increase water absorption, a method of causing the surface to be water absorbent by using photocatalytic activity, and a method of preventing adhesion of water droplets by applying a super water repellent treatment. Examples of the water repellent treatment method include a method of forming a water repellent treated layer by applying a fluorine-containing silane compound and the like by vapor deposition or sputtering and a method of dissolving a fluorine-containing silane compound in a solvent and performing coating to form a water repellent treated layer.

[Plastic Polarized Lens]

The plastic polarized lens of the present embodiment includes a polarizing film and a substrate layer including a molded product obtained by curing a polymerizable composition for an optical material of the present embodiment formed at least one surface of the polarizing film.

The polarizing film according to the present embodiment is formed of a thermoplastic resin. Examples of the thermoplastic resin include thermoplastic polyester, thermoplastic polycarbonate, thermoplastic polyolefin, and thermoplastic polyimide. In view of water resistance, heat resistance, and form workability, thermoplastic polyester and thermoplastic polycarbonate are preferable, and thermoplastic polyester is more preferable.

Examples of the thermoplastic polyester include polyethylene terephthalate, polyethylene naphthalate, and polybutylene terephthalate. In view of water resistance, heat resistance, and form workability, polyethylene terephthalate is preferable.

Specific examples of the polarizing film include a thermoplastic polyester polarizing film containing a dichroic dye, a polyvinyl alcohol polarizing film containing iodine, and a polyvinyl alcohol polarizing film containing a dichroic dye.

The polarizing film is dried and stabilized, and thus may be used after a heating treatment is performed.

In order to improve the adhesiveness to the acrylic resin, the polarizing film may be used after one or two or more kinds of pretreatments selected from a primer coating treatment, a chemical treatment (a chemical treatment such as gas or alkali), a corona discharge treatment, a plasma treatment, an ultraviolet ray irradiation treatment, an electron beam irradiation treatment, a surface roughening treatment, a flame treatment, and the like may be performed. Among such pretreatments, one or two or more kinds selected from a primer coating treatment, a chemical treatment, a corona discharge treatment, and a plasma treatment are particularly preferable.

The plastic polarized lens of the present embodiment can be obtained by providing a substrate layer that can be obtained by curing the polymerizable composition for an optical material of the present embodiment, on at least one surface of the polarizing film.

The method of manufacturing the plastic polarized lens is not particularly limited. However, preferable examples thereof include a cast polymerization method.

For example, the method of manufacturing the plastic polarized lens of the present embodiment may include a step of fixing a polarizing film to a lens casting mold in a state of being separated from the mold;

a step of injecting a polymerizable composition for an optical material to at least one of cavities formed between the polarizing film and the mold; and a step of polymerizing and curing the polymerizable composition for an optical material and laminating a substrate layer on at least one surface of the polarizing film.

The lens casting mold generally includes two substantially disc-shaped glass molds held by a gasket. The polarizing film is mounted in the cavity of this lens casting mold so as to be parallel to the inner surface of the mold on the front side where the film surface faces. A cavity portion is formed between the polarizing film and the mold. The polarizing film may be shaped in advance.

The polymerization condition of the polymerizable composition for an optical material differs depending on the composition of the polymerizable composition, the types and the use amount of the catalyst, and the shape of the mold, but the polymerization is performed at the temperature of 5° C. to 140° C. for 1 to 50 hours. In some cases, it is preferable that the temperature is maintained or is gradually increased in a temperature range of 5° C. to 130° C., and the polymerizable composition is cured for 1 to 25 hours.

The laminate cured by polymerization is released from the mold, so as to obtain a plastic polarized lens of the present embodiment.

According to the present embodiment, the laminate after polymerization and release may be subjected to a heating treatment such as annealing. With respect to the treatment temperature, in view of the effects of the present invention, the treatment is performed at 90° C. to 150° C., is preferably performed at 110° C. to 130° C., and more preferably performed at 115° C. to 125° C. In view of the effect of the present invention, the treatment time is in the range of 1 to 10 hours and preferably 2 to 5 hours.

The coating layer which is the same as the plastic spectacle lens may be formed on the surface of the obtained substrate layer.

According to the present embodiment, a plastic spectacle lens including a substrate formed of the polymerizable composition for an optical material is described. However, a layer formed of the polymerizable composition for an optical material of the present embodiment may be provided on a substrate which does not include a photochromic compound and an ultraviolet absorbing agent.

EXAMPLES

Hereinafter, the present invention is specifically described with reference to the examples. However, the present invention is not limited to the examples. The molded product and the plastic lens formed of a curing resin were evaluated by the following method.

Refractive index (ne) Abbe number (ve): Measurement was performed at 20° C. by using a Pulfrich refractometer KPR-30 manufactured by Shimadzu Corporation.

Specific gravity: Measurement was performed by the Archimedes method at 25° C.

Light transmittance: Light transmittance at 380 nm after color development: In a case where a color of a sample of a molded product processed to a thickness of 2.0 mm was developed for five minutes in the condition of an ultraviolet intensity of 1.2 mW/cm$^2$ measured by an integrated photometer at a temperature of 19° C. by using a light source device of a metal halide lamp (180 W), spectroscopy was measured by a transmission measurement system.

A smaller numerical value thereof exhibits higher performance of cutting ultraviolet rays.

Photochromic performance: light transmittance at 550 nm after color development: In a case where a color of a sample of a molded product processed to a thickness of 2.0 mm was developed for five minutes by an integrated photometer at a temperature of 23° C. by using a light source device of a MS-35AAF/FB xenon lamp manufactured by Ushio Inc. (illuminance 50,000 lux), spectroscopy was measured by using a MCPD-7700 transmission measurement system.

As the transmittance is smaller, light shielding properties during color development are higher, and smaller transmittance exhibits a high photochromic performance.

(Raw Material Used)
Photochromic Compound:
Reversacol Calder Blue (a polydimethylsiloxane chain, a naphthopyran-based chromophore (Formula 3))
Reversacol Trent Blue (a polydimethylsiloxane chain, a naphthopyran-based chromophore (Formula 3))
Reversacol Heath Green (a polyoxyalkylene chain, a naphthopyran-based chromophore (Formula 3))
Reversacol Wembley Grey (a polyoxyalkylene chain, a naphthopyran-based chromophore (Formula 3))
Reversacol Chilli Red (a polydimethylsiloxane chain, a naphthopyran-based chromophore (Formula 3))

Example 1

To 100.0 parts by weight of a SSS-55 monomer, 0.02 parts by weight of Reversacol Calder Blue (trade name), 0.01 parts by weight of Reversacol Trent Blue (trade name), and 0.031 parts by weight of Reversacol Heath Green (trade name) were added as the photochromic compound, 0.25 parts by weight of 2,2'-azobis[2,4-dimethylvaleronitrile], 0.03 parts by weight of 1,1-bis(t-butylperoxy) cyclohexane, and 0.10 parts by weight of 2-(2-hydroxy-5-t-octylphenyl) benzotriazole (VIOSORB 583 (trade name), manufactured by Kyodo Chemical Co., Ltd.) as an ultraviolet absorbing agent were added and stirring was performed for dissolution. Degassing was performed for 60 minutes under 5 mmHg. Filtration was performed with a 1-μm PTFE filter and injection into a mold formed of a glass mold and a tape was performed. This mold was put into an oven, and the temperature was gradually increased from 35° C. to 95° C. over 23 hours, so as to perform polymerization. After the polymerization was completed, the mold was extracted from the oven, release was performed, so as to obtain a resin flat sheet having a thickness of 2.0 mm. Annealing was performed on the obtained resin flat sheet at 110° C. for one hour. The obtained resin flat sheet had a refractive index (ne) of 1.547, an Abbe number (ve) of 40, and a resin specific gravity of 1.18.

The molded product was colorless and transparent, and had a satisfactory light control performance of being immediately colored in a case of being put placed under sunlight and being decolored in a case where a light ray was shielded. The light control performance of the molded product was evaluated so as to obtain a satisfactory result of light transmittance at 380 nm after coloration of 1.2% and light transmittance after color development at 550 nm of coloration of 27.0%. Results thereof are as presented in Table-1.

Example 2

A resin flat sheet having a thickness of 2.0 mm was obtained by the same method as in Example 1 except for changing Reversacol Calder Blue (trade name) to 0.03 parts by weight, Reversacol Trent Blue (trade name) to 0.015 parts by weight, and Reversacol Heath Green (trade name) to 0.0465 parts by weight, as the photochromic compounds. Results thereof are as presented in Table-1.

Example 3

A resin flat sheet having a thickness of 2.0 mm was obtained by the same method as in Example 1 except for changing Reversacol Wembley Grey (trade name) to 0.054 parts by weight and Reversacol Heath Green (trade name) to 0.0215 parts by weight as the photochromic compounds, and changing 2-(2-hydroxy-5-t-octylphenyl) benzotriazole to 0.02 parts by weight as the ultraviolet absorbing agent. Results thereof are as presented in Table-1.

Example 4

A resin flat sheet having a thickness of 2.0 mm was obtained by the same method as in Example 3 except for changing 2-(2-hydroxy-5-t-octylphenyl) benzotriazole to 0.10 parts by weight as the ultraviolet absorbing agent. Results thereof are as presented in Table-1.

Example 5

A resin flat sheet having a thickness of 2.0 mm was obtained by the same method as in Example 1 except for changing Reversacol Chilli Red (trade name) to 0.06 parts by weight and Reversacol Heath Green (trade name) to 0.09 parts by weight as the photochromic compounds, and changing 2-(2-hydroxy-5-t-octylphenyl) benzotriazole to 0.02 parts by weight as the ultraviolet absorbing agent. Results thereof are as presented in Table-1.

Example 6

A resin flat sheet having a thickness of 2.0 mm was obtained by the same method as in Example 5 except for changing 2-(2-hydroxy-5-t-octylphenyl) benzotriazole to 0.05 parts by weight as the ultraviolet absorbing agent. Results thereof are as presented in Table-1.

Example 7

A resin flat sheet having a thickness of 2.0 mm was obtained by the same method as in Example 1 except for changing 2-(2-hydroxy-5-methylphenyl) benzotriazole (TINUVIN P (trade name), manufactured by BASF SE) to 0.10 parts by weight as the ultraviolet absorbing agent. Results thereof are as presented in Table-1.

Example 8

A resin flat sheet having a thickness of 2.0 mm was obtained by the same method as in Example 1 except for changing 2-(2-hydroxy-5-t-butylphenyl) benzotriazole (TINUVIN PS (trade name), manufactured by BASF SE) to 0.15 parts by weight as the ultraviolet absorbing agent. Results thereof are as presented in Table-1.

Example 9

A resin flat sheet having a thickness of 2.0 mm was obtained by the same method as in Example 3 except for changing dimethyl (p-methoxybenzylidene) malonate (Hostavin PR-25 (trade name), manufactured by Clariant International Ltd.) to 1.0 parts by weight as the ultraviolet absorbing agent. Results thereof are as presented in Table-1.

Example 10

A resin flat sheet having a thickness of 2.0 mm was obtained by the same method as in Example 3 except for changing 2-ethyl-2'-ethoxyoxanilide (Hostavin VSU (trade name), manufactured by Clariant International Ltd.) to 1.0 parts by weight as the ultraviolet absorbing agent. Results thereof are as presented in Table-1.

Comparative Example 1

A resin flat sheet having a thickness of 2.0 mm was obtained by the same method as in Example 1 except for not adding an ultraviolet absorbing agent. Results thereof are as presented in Table-1.

Comparative Example 2

A resin flat sheet having a thickness of 2.0 mm was obtained by the same method as in Example 1 except for changing 2,2'4,4'-tetrahydroxybenzophenone (SEESORB 106 (trade name), manufactured by Shipro Kasei Kaisha, Ltd.) to 0.025 parts by weight as the ultraviolet absorbing agent. Results thereof are as presented in Table-1.

Comparative Example 3

A resin flat sheet having a thickness of 2.0 mm was obtained by the same method as in Example 1 except for changing 2,2'-dihydroxy-4,4'-dimethoxybenzophenone (SEESORB 107 (trade name)) to 0.020 parts by weight as the ultraviolet absorbing agent. Results thereof are as presented in Table-1.

Comparative Example 4

A resin flat sheet having a thickness of 2.0 mm was obtained by the same method as in Example 1 except for changing Benzenamine, 4-[7,9-dimethoxy-2-(4-methoxyphenyl)-5-methyl-2H-naphtho[1,2-b]pyran-2-yl]-N,N-dimethyl- to 0.0536 parts by weight, Morpholine, 4-[3-(4-methoxyphenyl)-3-phenyl-3H-naphtho[2,1-b]pyran-6-yl]- to 0.0064 parts by weight as the photochromic compounds. Results thereof are as presented in Table-1.

TABLE 1

| | | Component (A) | Component (B) | Content (B) | Component (C) | Content (C) | Transmittance during color development at 380 nm (%) | Transmittance during color development at 550 nm (%) |
|---|---|---|---|---|---|---|---|---|
| Example | 1 | SSS-55 MONOMER | GRAY: Coloring agent(1)/Coloring agent(2)/Coloring agent(3) = 200/100/310 ppm | 610 ppm | VIOSORB 583 | 1,000 ppm | 1.2 | 27.0 |
| | 2 | SSS-55 MONOMER | GRAY: Coloring agent(1)/Coloring agent(2)/Coloring agent(3) = 300/150/465 ppm | 915 ppm | VIOSORB 583 | 1,000 ppm | 0.5 | 22.4 |
| | 3 | SSS-55 MONOMER | GRAY: Coloring agent(3)/Coloring agent(4) = 215/540 ppm | 755 ppm | VIOSORB 583 | 200 ppm | 1.6 | 19.4 |
| | 4 | SSS-55 MONOMER | | 755 ppm | VIOSORB 583 | 1,000 ppm | 0.6 | 21.8 |
| | 5 | SSS-55 MONOMER | BROWN: Coloring agent(3)/Coloring agent(5) = 900/600 ppm | 1500 ppm | VIOSORB 583 | 200 ppm | 1.6 | 25.0 |
| | 6 | SSS-55 MONOMER | | | VIOSORB 583 | 500 ppm | 1.5 | 28.0 |
| | 7 | SSS-55 MONOMER | GRAY: Coloring agent(1)/Coloring agent(2)/Coloring agent(3) = 200/100/310 ppm | 610 ppm | TINUVIN P | 1,000 ppm | 1.1 | 27.4 |
| | 8 | SSS-55 MONOMER | | | TINUVIN PS | 1,500 ppm | 0.5 | 26.7 |
| | 9 | SSS-55 MONOMER | GRAY: Coloring agent(3)/Coloring agent(4) = 215/540 ppm | 755 ppm | Hostavin PR-25 | 10,000 ppm | 1.9 | 18.3 |
| | 10 | SSS-55 MONOMER | | 755 ppm | Hostavin VSU | 10,000 ppm | 1.8 | 17.8 |
| Comparative Example | 1 | SSS-55 MONOMER | GRAY: Coloring agent(1)/Coloring agent(2)/Coloring agent(3) = 200/100/310 ppm | 610 ppm | — | 0 ppm | 9.1 | 20.0 |
| | 2 | SSS-55 MONOMER | | 610 ppm | SEESORB 106 | 250 ppm | 1.0 | 35.0 |
| | 3 | SSS-55 MONOMER | | 610 ppm | SEESORB 107 | 200 ppm | 0.9 | 36.3 |

TABLE 1-continued

| Component (A) | Component (B) | Content (B) | Component (C) | Content (C) | Transmittance during color development at 380 nm (%) | Transmittance during color development at 550 nm (%) |
|---|---|---|---|---|---|---|
| 4 SSS-55 MONOMER | GRAY: *1 | 600 ppm | VIOSORB 583 | 1,000 ppm | 1.2 | 46.0 |

Components presented in Table-1 are as follows.
Coloring agent (1): Reversacol Calder Blue
Coloring agent (2): Reversacol Trent Blue
Coloring agent (3): Reversacol Heath Green
Coloring agent (4): Reversacol Wembley Grey
Coloring agent (5): Reversacol Chilli Red
*1: Including 0.0536 parts by weight of Benzenamine, 4-[7,9-dimethoxy-2-(4-methoxyphenyl)-5-methyl-2H-naphtho[1,2-b]pyran-2-yl]-N,N-dimethyl- and 0.0064 parts by weight of Morpholine, 4-[3-(4-methoxyphenyl)-3-phenyl-3H-naphtho[2,1-b]pyran-6-yl]-.

It was assumed that the same result was able to be obtained with the plastic polarized lens.

This application is based on priority application based on Japanese Patent Application No. 2015-183492 filed on Sep. 16, 2015, and Japanese Patent Application No. 2015-240354 filed on Dec. 9, 2015, and all of the disclosures thereof are incorporated hereto.

The invention claimed is:

1. A polymerizable composition for an optical material, comprising:
a monomer mixture (A) including a polymerizable monomer having a (meth)acrylic group, where the monomer mixture (A) is a mixture of four monomers represented by Formulae (i), (ii), (iii), and (iv), respectively;
a photochromic compound (B) which is at least one selected from compounds represented by Formulae (1) and (2); and
an ultraviolet absorbing agent (C) which is at least one selected from compounds represented by Formulae (b) to (c),

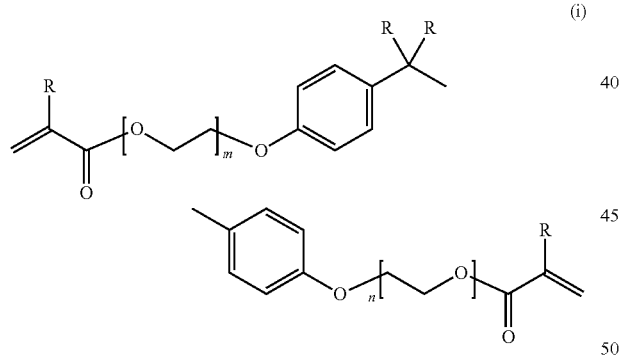
(i)

in the formula (i), R represents a hydrogen atom or a methyl group, and a plurality of R's existing together may be identical to or different from each other, and m and n represent an integer of 0 to 20 and may be identical to or different from each other;

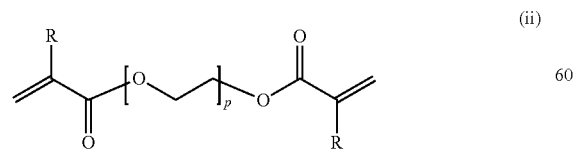
(ii)

in the formula (ii), R represents a hydrogen atom or a methyl group, and a plurality of R's existing together may be identical to or different from each other, and p represents an integer of 0 to 20;

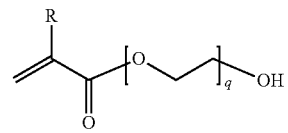
(iii)

in the formula (iii), R represents a hydrogen atom or a methyl group, and q represents an integer of 0 to 20;

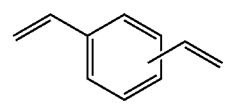
(iv)

PC-L-Chain (1)

PC-L-Chain-L'-PC' (2)

wherein in Formula (1) or (2), PC and PC' represent monovalent groups derived from compounds of Formulae (3) to (6), and PC and PC' may be identical to or different from each other,

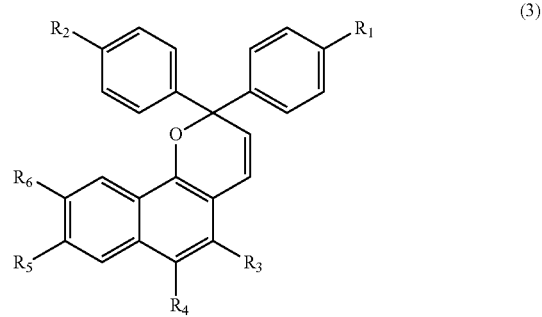
(3)

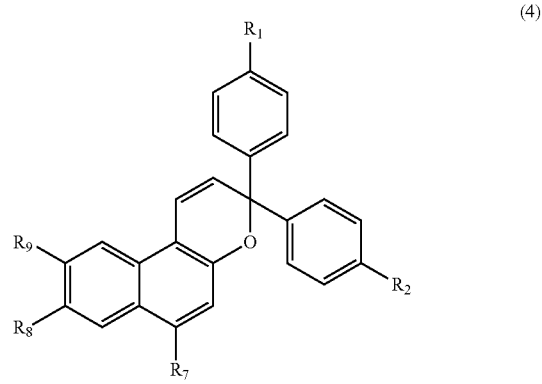
(4)

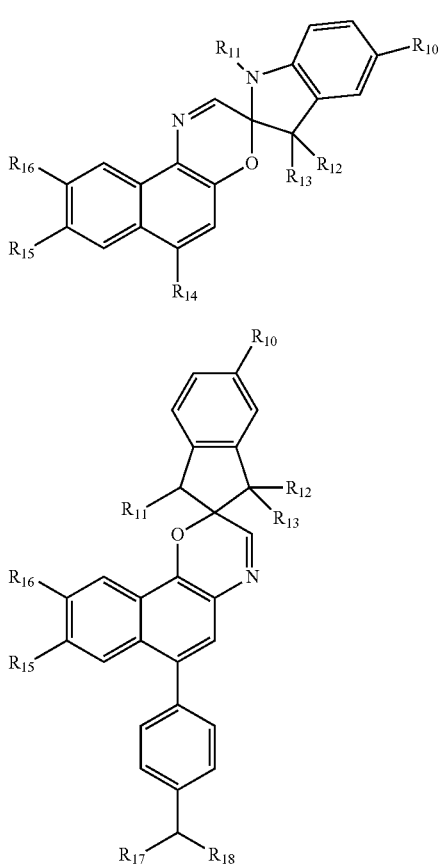

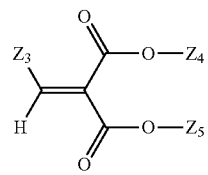

in Formula (c), $Z_3$ represents an optionally substituted C6 to C20 aromatic organic group and an optionally substituted C5 to C20 alicyclic group, and $Z_4$ and $Z_5$ may be identical to or different from each other and represent a C1 to C6 alkyl group and a C1 to C6 alkoxy group.

2. The polymerizable composition for an optical material according to claim 1,
wherein the ultraviolet absorbing agent (C) is at least one selected from 2-ethyl-2'-ethoxyoxanilide and dimethyl (p-methoxybenzylidene) malonate.

3. A molded product obtained by curing the polymerizable composition for an optical material according to claim 1.

4. An optical material formed of the molded product according to claim 3.

5. A plastic lens formed of the molded product according to claim 3.

6. A plastic polarized lens comprising:
a polarizing film; and
a substrate layer formed of the molded product according to claim 4 formed on at least one surface of the polarizing film.

7. A method of manufacturing a plastic lens, comprising:
a step of collectively mixing a monomer mixture (A) including a polymerizable monomer having a (meth) acrylic group, where the monomer mixture (A) is a mixture of four monomers represented by Formulae (i), (ii), (iii), and (iv), respectively, a photochromic compound (B) which is at least one selected from compounds represented by Formulae (1) and (2), and an ultraviolet absorbing agent (C) which is at least one selected from the compounds represented by Formulae (b) to (c) to prepare a polymerizable composition for an optical material; and
a step of performing cast polymerization on the polymerizable composition for an optical material to form a lens substrate, in Formulae (3) to (6), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom and a nitrogen atom, and any one group included in the compounds represented by Formulae (3) to (6) is bonded to L or L' which is a divalent organic group;
in Formula (1) or (2), L and L' each represent a divalent organic group including one or more selected from an oxyethylene chain, an oxypropylene chain, a (thio)ester group, and a (thio)amide group, and in Formula (1) or (2), Chain represents a monovalent or divalent organic group including one or more selected from a polysiloxane chain and a polyoxyalkylene chain;

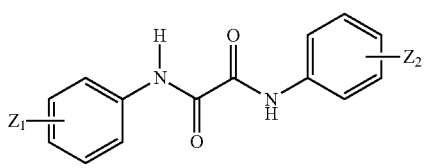

in Formula (b), $Z_1$ and $Z_2$ may be identical to or different from each other, and represent a C1 to C6 alkyl group and a C1 to C6 alkoxy group;

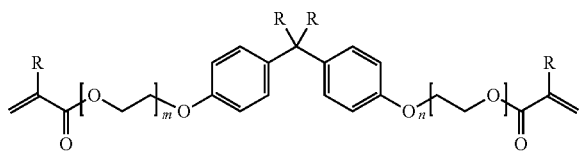

in the formula (i), R represents a hydrogen atom or a methyl group, and a plurality of R's existing together may be identical to or different from each other, and m and n represent an integer of 0 to 20 and may be identical to or different from each other;

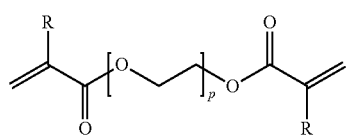

(ii)

in the formula (ii), R represents a hydrogen atom or a methyl group, and a plurality of R's existing together may be identical to or different from each other, and p represents an integer of 0 to 20;

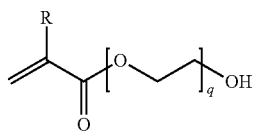

(iii)

in the formula (iii), R represents a hydrogen atom or a methyl group, and q represents an integer of 0 to 20;

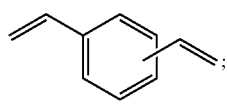

(iv)

PC-L-Chain (1)

PC-L-Chain-L'-PC' (2)

wherein in Formula (1) or (2), PC and PC' represent monovalent groups derived from compounds of Formulae (3) to (6), and PC and PC' may be identical to or different from each other,

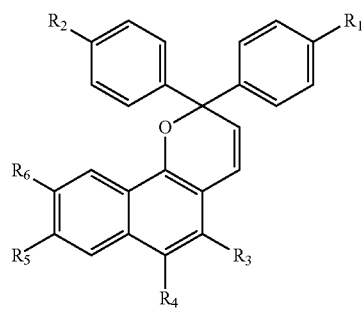

(3)

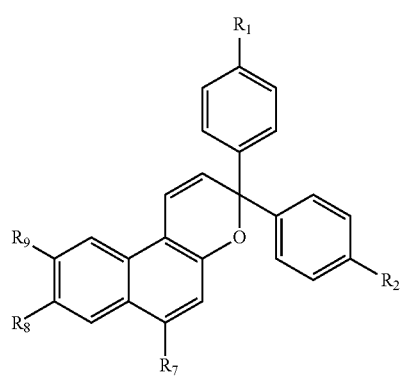

(4)

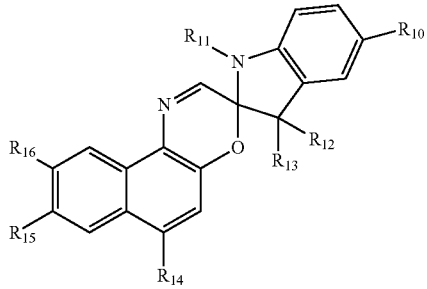

(5)

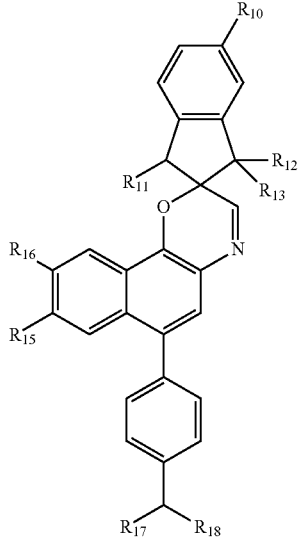

(6)

in Formulae (3) to (6), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom and a nitrogen atom, and any one group included in the compounds represented by Formulae (3) to (6) is bonded to L or L' which is a divalent organic group;

in Formula (1) or (2), L and L' each represent a divalent organic group including one or more selected from an oxyethylene chain, an oxypropylene chain, a (thio)ester group, and a (thio)amide group, and in Formula (1) or (2), Chain represents a monovalent or divalent organic group including one or more selected from a polysiloxane chain and a polyoxyalkylene chain;

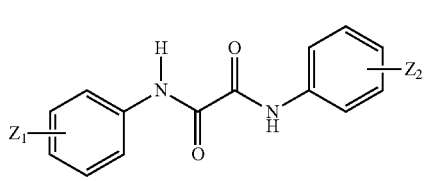

(b)

in Formula (b), $Z_1$ and $Z_2$ may be identical to or different from each other, and represent a C1 to C6 alkyl group and a C1 to C6 alkoxy group;

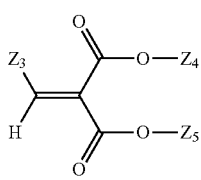

(c)

in Formula (c), $Z_3$ represents an optionally substituted C6 to C20 aromatic organic group and an optionally substituted C5 to C20 alicyclic group, and $Z_4$ and $Z_5$ may be identical to or different from each other and represent a C1 to C6 alkyl group and a C1 to C6 alkoxy group.

8. A method of manufacturing a plastic polarized lens, comprising:
- a step of collectively mixing a monomer mixture (A) including a polymerizable monomer having a (meth)acrylic group, where the monomer mixture (A) is a mixture of four monomers represented by Formulae (i), (ii), (iii), and (iv), respectively, a photochromic compound (B) which is at least one selected from compounds represented by Formulae (1) and (2), and an ultraviolet absorbing agent (C) which is at least one selected from compounds represented by Formulae (b) to (c) to prepare a polymerizable composition for an optical material;
- a step of fixing a polarizing film to a lens casting mold in a state of being separated from the mold;
- a step of injecting the polymerizable composition for an optical material to at least one of cavities formed between the polarizing film and the mold; and
- a step of polymerizing and curing the polymerizable composition for an optical material and laminating a substrate layer on at least one surface of the polarizing film,

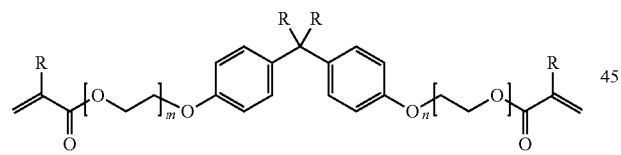

(i)

in the formula (i), R represents a hydrogen atom or a methyl group, and a plurality of R's existing together may be identical to or different from each other, and m and n represent an integer of 0 to 20 and may be identical to or different from each other;

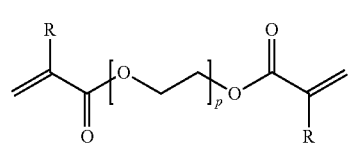

(ii)

in the formula (ii), R represents a hydrogen atom or a methyl group, and a plurality of R's existing together may be identical to or different from each other, and p represents an integer of 0 to 20;

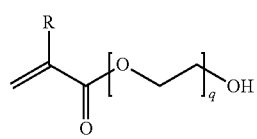

(iii)

in the formula (iii), R represents a hydrogen atom or a methyl group, and q represents an integer of 0 to 20;

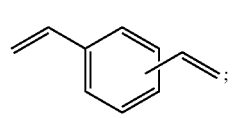

(iv)

PC-L-Chain (1)

PC-L-Chain-L'-PC' (2)

wherein in Formula (1) or (2), PC and PC' represent monovalent groups derived from compounds of Formulae (3) to (6), and PC and PC' may be identical to or different from each other,

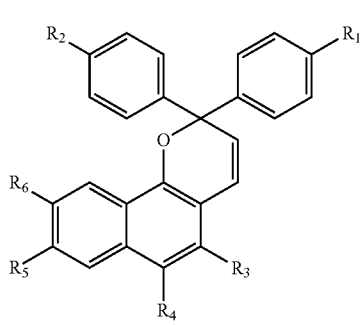

(3)

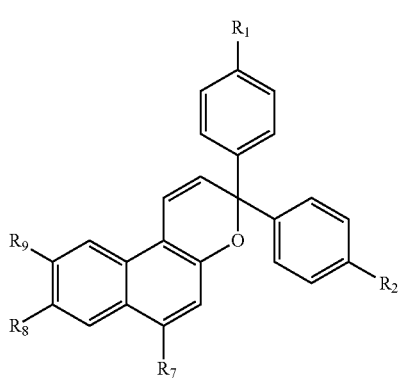

(4)

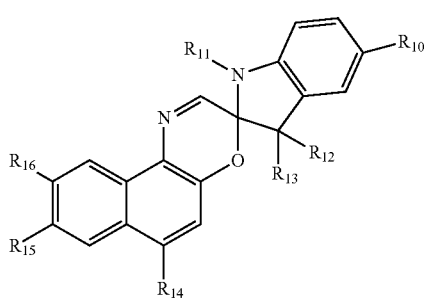

(5)

-continued

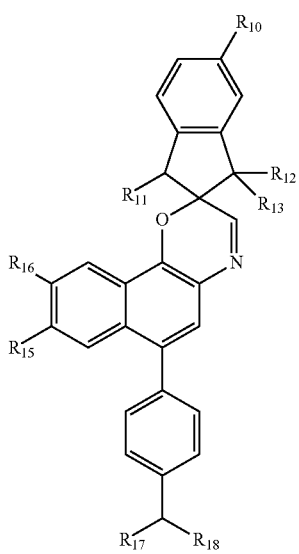
(6)

in Formulae (3) to (6), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom and a nitrogen atom, and any one group included in the compounds represented by Formulae (3) to (6) is bonded to L or L' which is a divalent organic group;

in Formula (1) or (2), L and L' each represent a divalent organic group including one or more selected from an oxyethylene chain, an oxypropylene chain, a (thio)ester group, and a (thio)amide group, and in Formula (1) or (2), Chain represents a monovalent or divalent organic group including one or more selected from a polysiloxane chain and a polyoxyalkylene chain;

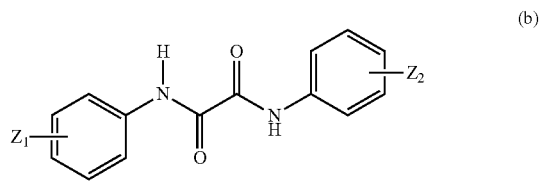
(b)

in Formula (b), $Z_1$ and $Z_2$ may be identical to or different from each other, and represent a C1 to C6 alkyl group and a C1 to C6 alkoxy group;

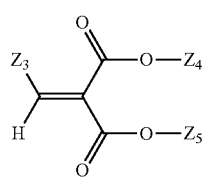
(c)

in Formula (c), $Z_3$ represents an optionally substituted C6 to C20 aromatic organic group and an optionally substituted C5 to C20 alicyclic group, and $Z_4$ and $Z_5$ may be identical to or different from each other and represent a C1 to C6 alkyl group and a C1 to C6 alkoxy group.

* * * * *